(12) United States Patent
Tal et al.

(10) Patent No.: US 12,300,001 B2
(45) Date of Patent: May 13, 2025

(54) SYSTEM AND METHOD FOR TRAFFIC SIGNAGE INSPECTION THROUGH COLLECTION, PROCESSING AND TRANSMISSION OF DATA

(71) Applicant: VISUAL DEFENCE INC., Richmond Hill (CA)

(72) Inventors: Royi Tal, Markham (CA); Thomas Bakonyi, Toronto (CA); Redenthor Ibana, Ajax (CA); Omri Artman, Toronto (CA)

(73) Assignee: VISUAL DEFENCE INC., Ontario (CA)

(*) Notice: Subject to any disclaimer, the term of this patent is extended or adjusted under 35 U.S.C. 154(b) by 361 days.

(21) Appl. No.: 17/853,918

(22) Filed: Jun. 30, 2022

(65) Prior Publication Data

US 2022/0335730 A1    Oct. 20, 2022

Related U.S. Application Data

(63) Continuation-in-part of application No. 17/559,315, filed on Dec. 22, 2021, which is a continuation-in-part of application No. 16/930,070, filed on Jul. 15, 2020, now Pat. No. 11,481,991.

(51) Int. Cl.
| | | |
|---|---|---|
| *G06V 20/58* | (2022.01) | |
| *B60R 11/04* | (2006.01) | |
| *G06F 16/29* | (2019.01) | |

(52) U.S. Cl.
CPC ............ *G06V 20/582* (2022.01); *B60R 11/04* (2013.01); *G06F 16/29* (2019.01)

(58) Field of Classification Search
CPC .... G06V 20/532; G06V 20/582; G06F 16/29; B60R 11/04
See application file for complete search history.

(56) References Cited

U.S. PATENT DOCUMENTS

| | | | |
|---|---|---|---|
| 2014/0344445 A1* | 11/2014 | Lee ..................... | H04L 43/0876 |
| | | | 709/224 |
| 2017/0200061 A1 | 7/2017 | Julian et al. | |
| 2017/0372339 A1* | 12/2017 | Davis ................... | G06Q 10/087 |
| 2018/0330526 A1 | 11/2018 | Corcoran | |
| 2019/0034735 A1 | 1/2019 | Cuban et al. | |
| 2020/0349846 A1* | 11/2020 | Siboni .................... | G06T 7/593 |
| 2022/0058405 A1* | 2/2022 | Pogorelik ......... | G06F 18/24143 |

FOREIGN PATENT DOCUMENTS

| | | | | |
|---|---|---|---|---|
| DE | 102015205094 | * | 9/2016 | ............... G06K 9/62 |

* cited by examiner

*Primary Examiner* — Myron Wyche
(74) *Attorney, Agent, or Firm* — Tarolli, Sundheim, Covell & Tummino LLP

(57) ABSTRACT

System and methods for automated sign data collection and reporting while operating a vehicle on the road using a device. The device automatically determines when to collect, store, process and transmit data. Additionally, a system and method for further storing, transmitting, processing, organizing and accessing the information with respect to the collected data.

20 Claims, 13 Drawing Sheets

SYSTEM AND METHOD FOR TRAFFIC SIGNAGE INSPECTION THROUGH COLLECTION, PROCESSING AND TRANSMISSION OF DATA

CROSS-REFERENCE TO RELATED APPLICATIONS

This application is a continuation-in-part application of U.S. patent application Ser. No. 17/559,315 filed on Dec. 22, 2021 entitled "SYSTEM AND METHOD FOR OPTIMIZING COLLECTION AND TRANSMISSION OF SURVEYING DATA ACROSS A ROAD NETWORK" which is a continuation-in-part of U.S. patent application Ser. No. 16/930,070 filed on Jul. 15, 2021 entitled "SYSTEM AND METHOD FOR DETECTING AND TRANSMITTING INCIDENTS OF INTEREST OF A ROADWAY TO A REMOTE SERVER"; the contents of which are hereby incorporated by reference.

FIELD

The present invention is related to the inspection field, including image and data acquisition and artificial intelligence.

BACKGROUND

Safety on roads is a primary concern for governments and road operators, as they work to ensure that traffic can flow safely along the roads in their jurisdiction. One of the tools used by road owners to help control, direct, guide, advise and inform road users travelling along their streets are traffic control devices. Traffic control devices refer to signs, signals, and pavement markings installed at key locations along roadways that promote roadway safety and traffic control by conveying useful information to road users.

A sign is typically placed upon, over, adjacent or alongside a road, highway, or street by a public authority or official having jurisdiction, whether governmental or private; the sign is intended to regulate, warn, or guide the road user.

Traffic signage constitutes a system for conveying messages to the road user. The messages inform the road user of the traffic regulations in effect, communicate the law, advise/warn of road characteristics and/or road conditions, potential or actual road hazards as well as temporary conditions, and provide route selection information. This helps to improve safety, serve the convenience of the road user, and promote the efficient movement of persons, goods and the orderly flow of traffic.

Signage can be regulated on the federal, state/provincial, regional, local or individual government basis. Uniformity in the design and application of signage simplifies understanding of signage by road users. Standardization of signage can include the consistent use of sign shape, colors, size, font, font size, fluorescence, and luminance across one or more jurisdiction, making it easier for road users to understand the message conveyed by the sign. Signs are intended to function in day time and night time, and as such typically have retro-reflective properties.

The aforementioned "retroreflectivity" describes the ability of a surface to return light to its source. If something is retroreflective, then it can return a large portion of directed light back to its source. This greatly increases its visibility for observers near the light source. The application of a retroreflective coating is almost universally used on road signs to increase their visibility and legibility in low-light or night-time conditions, wherein a vehicle's headlights would provide the light source necessary for the retroreflective coating to render the sign legible for the vehicle's driver.

Signs can also be supplemented by sign tabs, or sign add-ons, which can provide supplementary information. For example, a tab can indicate whether the regulatory affect of a speed sign "begins" or "ends", or whether the "stop" requirement is 2-way or all-way.

Signs are considered assets which need to be maintained by the organization with the jurisdiction to do so, or by a contractor on behalf of the organization. Signs, depending on their type, can also act as a traffic control device (for example, a stop sign in an intersection), and as such, they can need to be present in order to ensure safety on roads.

Depending on the jurisdiction, signage can be grouped to categories, such as regulatory, warning and guidance/information. Regulatory signs indicate a traffic regulation that applies at a specific time and/or place on a road, where disregarding of a regulatory sign constitutes a violation. Warning signs provide an advance indication of conditions on or adjacent to a road that are potentially hazardous to drivers. Guidance and information signs indicate information for route selection, for locating off-road facilities, or for identifying geographical features or points of interest.

Signs require maintenance. Depending on the jurisdiction, the road operator/government/responsible organization can be responsible for signage quantities ranging from tens to tens of thousands of signs and potentially more. Civil, mechanical, environmental, and material factors affect the longevity and effective use of signs, and can result in failures. Some examples of sign failures include: (a) damage to sign or post due to collision; (b) damage to sign or post due to rust; (c) damage to sign or post due to mechanical failure of a component, such as a bolt or a screw; (d) damage to sign or post due to extreme weather event, such as high wind; (e) leaning or fallen sign post (and sign); (f) fading of paint on sign; (g) peeling or failure of adhesive on sign print; (h) faded appearance; (i) degraded retro-reflectivity; and (j) other types of failures.

Failures can not be limited just to the physical sign itself, but can also be a function of its environment. For example, signs can be occluded by vegetation, snow piles and other objects (for example, poles, bins, bus stations, and even other signs). It is typically the responsibility of the jurisdictional authority or its agents to make sure that the signs are visible through clearing obstructions or relocating the sign.

Due to the safety function of signs, road operators, jurisdictional authorities, local governments or maintenance agents typically have a requirement to keep the signs in appropriate condition to direct traffic. The requirement can be based on law(s), legislation(s), regulation(s), standard(s), judicial precedent(s), or best practices(s). In the event of a collision, by-law dispute, claim, litigation or otherwise, failure to properly maintain a sign can result in a detrimental outcome for the authority. This can include issues with enforcement of laws, litigation, and/or claims, including for liability to the road authority in the event of personal injury, death, or property damage related to the sign failure.

To address such issues, some jurisdictional authorities (typically on the federal or state level), set standards (also known as minimum maintenance standards), which seek to establish what are the best practices to maintain signs and keeping the roads safe, while factoring in the resource constraints of the local authorities/organizations required to maintain the signs. In the event of a dispute, these standards help to establish whether the authority required to maintain the sign did its job according to best practices or not. This helps to establish whether there is liability. For example, in a particular state or province, the maintenance standard can call for retroreflectivity of signs to be verified roughly once per calendar year, including establishing the criteria of what is an acceptable retro-reflective sign. The maintenance standard can also set a time frame for repairing signs that the responsible authority has been made aware are defective. The standard can also call for patrol or inspection by dedicated staff to identify such issues.

Due to its importance, the inspection of the retroreflectivity of road signage is a key part of maintenance in many places around the world. Current techniques are to measure the retroreflectivity value using a reflectometer, or a visual inspection by a trained personnel. Both of these options have drawbacks. Reflectometers can be quite expensive, and require the operating personnel to be trained in reading the reflectometer readings. Visual inspections do not require additional equipment, but can be done at night in order to get an accurate measure of the sign's retroreflectivity in nighttime conditions.

In some jurisdictions, the inspector is recommended to be 50 years old or older, in order to ensure that the sign is also visible to aging motorists, as scientific reports have shown that older adults require up to eight times more light as young adults to read road signs at night. Furthermore, a visual inspection can only provide qualitative data about the visibility of the sign, not any hard numbers that could be used to track retroreflectivity data over time.

In the event that there are no federal or state level maintenance standards, then the organization responsible for maintenance of the signs can establish its own procedures, and can have to defend said procedures as best practices in the event of a dispute, claim or litigation.

Staff required to inspect signs can collect a variety of data related to signs. Examples include sight-line distance, geographical location, status (for example occluded, broken, faded, graffiti, etc), retro-reflectivity, accounting for tabs, facing direction, nearest intersection, and other data which can then logged into a sign inventory system. Traditional methods involve manual data entry systems by city personnel, which can be cumbersome and leaves an element of human error. Some municipalities can not even have proper tracking of their electronic signs, which would further hamper their ability to maintain their municipal signage. It would be difficult, if not impossible, to formulate a plan for proper signage maintenance without a robust system for organizing road signage data. For current digital systems, the staff is required to manually log or update the data.

SUMMARY

It is an object of the present invention to provide a data collection system and/or method which optimizes the data collection, transfer, and processing through various technological means which reduces extensive data transmission and processing requirements as noted above.

An electronic computer vision solution that integrates both detecting and recording road signage factors, such as but not limited to civil, mechanical, environmental, and material factors which could affect the longevity and effective use of signs, could give asset owners, including local, state and/or federal governments, the data needed to formulate a comprehensive and effective road signage maintenance plan that fits their needs. Any metrics that such a system records could be processed and uploaded to a server, utilizing wireless data transfer technologies such as Wi-Fi, 4G, LTE, or 5G, or be delivered through physical file transfer. This data could then be analyzed and used by municipal personnel to more accurately assess the conditions of all of the municipalities' sign assets, as well as develop a plan for maintaining, replacing, or adding new, assets as necessary.

The implementation of such a system, and the subsequent increased access to relevant data for analysis, could then be used to augment any existing road maintenance, budgeting, or planning initiatives that can already be in place.

The process of inspecting signage to ensure proper maintenance standards is extremely costly, and many governmental and private organizations rely on dedicated staff to note issues using pen and paper. Even when equipped with digital systems, many issues are still overlooked as people have a limited capacity in their ability to collect information and log it on a timely manner.

To exacerbate this issue, some qualities of road signage, (for example, retro reflectivity), traditionally require either specialized equipment, trained personnel, or both to properly operate. Alternatively, governmental and private organizations can use providers which facilitates them to upload video or image data, to be processed on a remote server, to provide such reports. However, large amount of video files and images are expensive to transmit and process. The collected data can also include data from roads which are owned by other organizations, providing further waste. The associated costs make it uneconomical to regularly inspect signs using such technologies.

While strides have been taken to provide a more technological approach to signage surveying, such as uploading pictures of signage to a server to be analyzed, or having general images of municipal roads then finding street signage through image processing, these images still require manual capture or extensive data collection before being uploaded to a server for analysis. Thus, most current solutions either require a great deal of manual input, high volume of data to be transmitted, or both. The system noted herewith aims to greatly reducing the amount of manual input by facilitating for autonomous data collection, as well as facilitating for the image and data processing to be done on the device, while occasionally being augmented by the server, as opposed to solely relying on the server for processing.

One aspect provided relies on a device equipped with sensors, camera(s) and computing/processing capabilities to collect data. The collected data, when processed together with other sources of information, could be filtered directly on the device, resulting in a significant reduction in the amount of data that needs to be transmitted, stored and processed on the server.

The collected data can be combined with different sources of data, such as information about GIS assets, metadata acquired from images using artificial intelligence, and data obtained from the server (such as parameters and/or updates from other devices) to optimize the data collection process such that the right data is collected at the right place at the right time. The device itself performs data processing functions, including generation of new data, helping to reduce the processing load on the server. This means that the device can perform its functions without a network connection, with any data collected and processed while offline being stored for transmission until a network connection has been re-established.

Finally, the data collection device works in conjunction with a server, which processes the data, stores it, and makes the collected data, along with derivative data produced by the data collection device and/or the server. The data is then organized and presented in a manner which facilitates the users to make better decisions about maintenance activities for the surveyed sign asset and related assets. The data analyzed by the server can also be sent back to the device to improve the device's data processing ability.

Users can review the collected data using client software which is connected to the server, and address any deficiencies with the signs identified by the system.

A further aspect provided is a mobile system for collecting data associated with signs along a roadway and for transmitting resultant sign data over a communications network to a server, the server located remotely from the system, the system comprising: at least one device having: at least one camera for obtaining digital images of the signs as the system moves along the roadway; at least one sensor for acquiring sensor data; a network interface for sending and receiving data over the communications network to the server during operation of the system on the roadway; and a memory having stored instructions thereon for execution by a computer processor for: receiving the digital images of the data and processing the digital images using image processing instructions of the stored instructions in order to determine object identification data of a sign in the digital images; receiving the sensor data from the at least one sensor indicative of geolocation information associated with the sign; comparing the geolocation information and the object identification data to contents of a geospatial sign database in an effort to identify the sign in the geospatial database; generating the resultant sign data based on said comparing; and sending the resultant sign data to the server over the communications network.

BRIEF DESCRIPTION OF THE DRAWINGS

Exemplary embodiments of the invention can now be described in conjunction with the following drawings, by way of example only, in which.

DETAILED DESCRIPTION

Figure 1A:
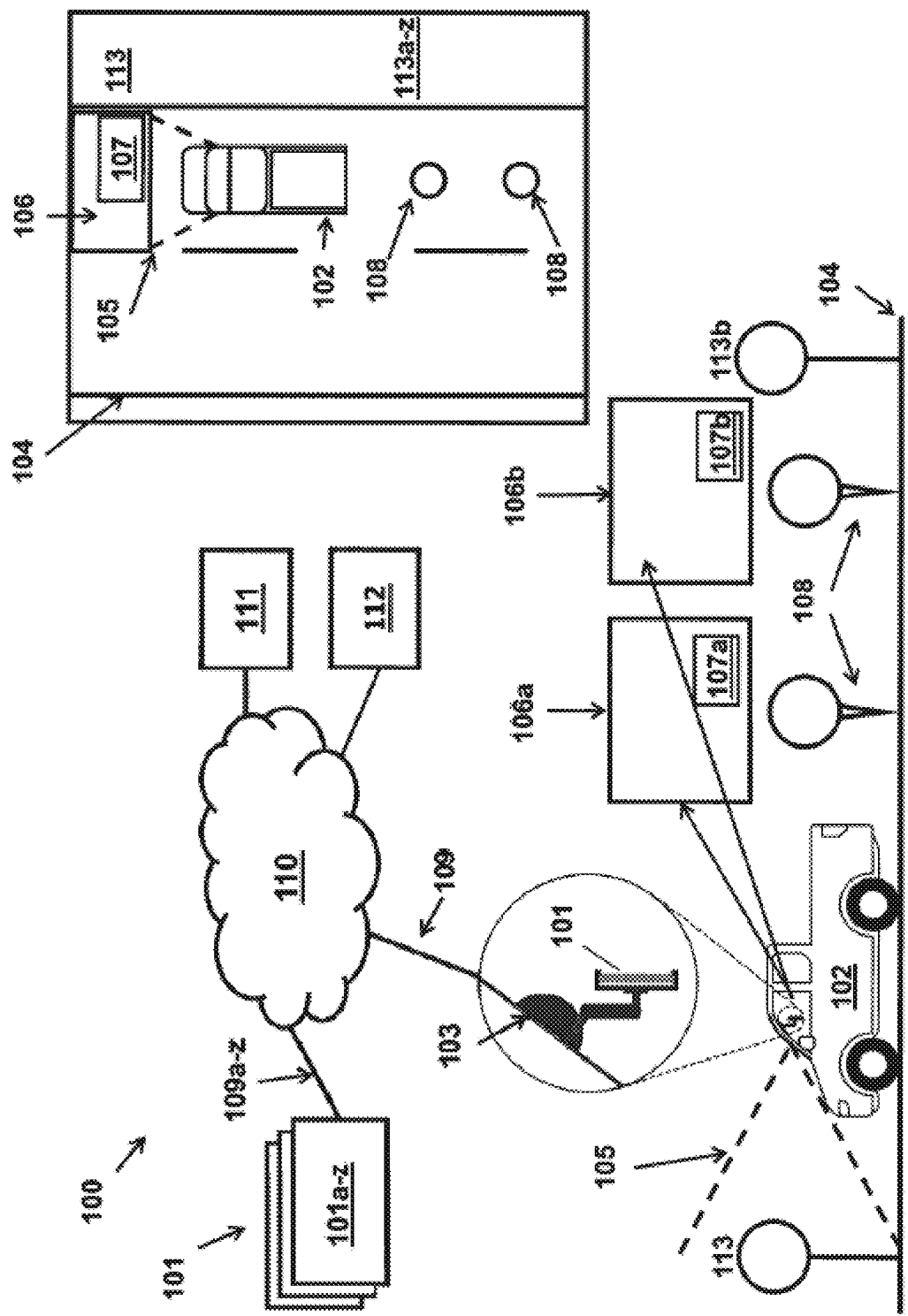
FIG. 1A depicts a system using a sign inspection device deployed in a vehicle and inspecting signage along a roadway.

Referring to FIG. 1a, a sign inspection system 100, includes an asset inspection device 101 mounted in a vehicle 102 using a mounting component 103. The device 101 can be a smart phone 101, a smart camera device 101, or an embedded platform with an imaging component 101. The device 101 can be attached to 103 to the windshield or the body of the vehicle 102. It can be attached 103 to the vehicle 102 using a suction cup, screws, bolts, twist knobs, adhesive, clasp, magnet, or other mechanical docking or attachment system which would attach 103 the device 101 to the vehicle 102. The attachment mechanism 103 can be either easily removable, providing for the device 101 to be transferred between different vehicles 102 or not easily removable, making the device 101 use primarily dedicated to a specific vehicle 102. The device 101 can be attached 103 internally to the vehicle 102 or externally.

While the vehicle 102 is traveling on the roadway 104, the device 101 collects image 106 data and associated sensor data 107 (collectively, "collected data" 108). The image data 106 represents data captured within the device's 101 camera field of view 105. The image data 106 and other associated sensor data 107 could also be represented as a data point 108, which represents the respective data 106,107 captured in a specific location (e.g. a specific geolocation) at a specific time by a specific device 101. The image data 106 and other associated sensor data 107 could also be also be composed of data captured or derived from one or more other data 106, 107 associated with other (e.g. adjacent) data points 108, being data collected from one or more location(s), at one or more time(s), by one or more device(s). For greater clarity, collected data 108 can refer collectively to both the data collected, in its original form, and its processed or derivative data. In other words, the collected data 108 can be used to represent data 106, 107 collected by representative systems of the device 101 at a particular location and/or time.

As such, each Collected Data point 108 includes image(s) 106 and/or data 107 from various sensors. The collected data 108 is processed and stored by the device's 101 software to detect signs 113 as well as derive data about the traffic signs 113, for example by digitally processing the image data 106. The signs 113 inspected by the device 101 (i.e. determined or otherwise identified in the images 106 via digital image processing) can include all signs 113 or a subset of the regulatory, warning, guidance and information signs 113 visible in the device's 101 field of view 105. The processed data (not depicted) is then transmitted 109 through a cellular or wireless network to a remote server 111 using a network 110, such as the internet 110. Multiple instances of the device 101a-z can be used to transmit 109a-z data through network 110, including collected and processed data regarding all the signs 113a-z that the vehicle 102 has captured. The transmission 109 can (or not) use encryption to secure the data 106,107 as it traverses networks and/or the internet 110. The server 111 can then further process and organize the data 106,107 transmitted by the devices 101a-z for presentation to users, which can access it through a client software, such as a web browser 112 or a dedicated software application 112 on a workstation.

Figure 1B:
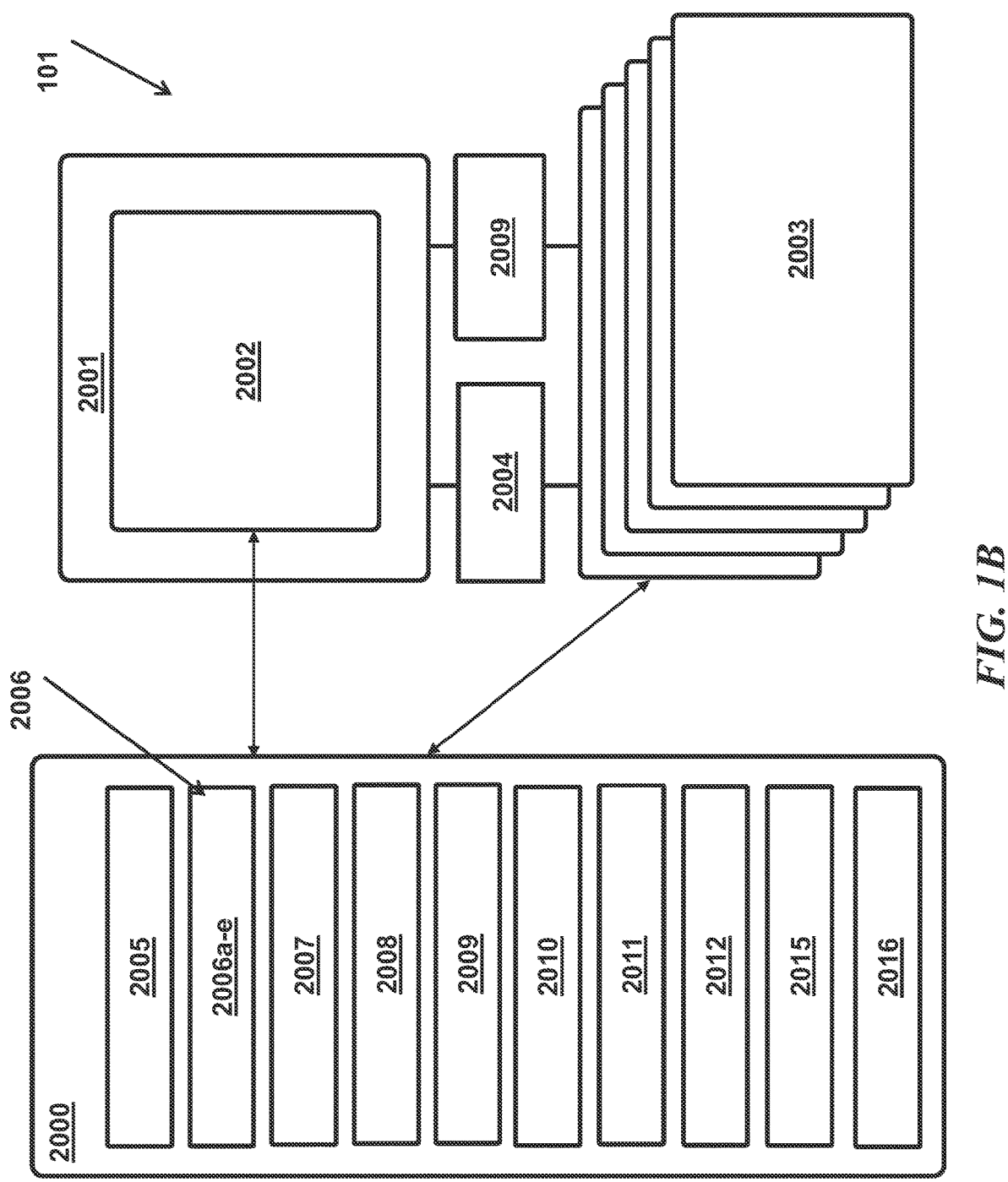
FIG. 1B depicts hardware components of the device that can be related to the system of FIG. 1.

Referring to FIGS. 1b and 1a, device 101 is a device that consists of some combination of hardware components 2000, that comprises an in vehicle system for collecting signage data 108 and transmitting the data 108 to the server 111.

These components 2000 can be electronically coupled as internal components 2002, existing on one circuit board or several connected circuit boards, within an enclosure 2001 (e.g. housing). The connected circuit boards can be referred to as motherboard, daughterboard, interface board, single board computer, expansion board, assemblies, sensor boards, camera board, and other such common names to describe a specific or broad use of a circuit board. In some embodiments, the device 101 would be smartphone 101, containing one or more circuit boards, with integrated components 2002 (of the one or more hardware components 2000).

The components 2000 can also be connected to the device 101 externally 2003, through one or more connection interface(s) 2004. For example, the device 101 connecting to one or more external camera(s) or sensor(s) (generically referred to as hardware components 2000) to give the device 101 enhanced video and data capturing capabilities.

The interface 2004 can be wired and wireless, to facilitate electronic communication between the device 101 and any external hardware 2003. Examples of wired connection interfaces 2004 include but are not limited to USB, Lightning, and other electrical connection interfaces, while examples of wireless connection interfaces 2004 include but are not limited to Bluetooth, Wi-Fi, and other wireless connections. The connection interface 2004 is able to accept either a single connection or a plurality of connections. In some cases, the interface 2004 provides power and communications simultaneously.

Device 101 can have one or more camera(s) 2005 with different focal lengths, image sensors and functions. Some camera(s) 2005 can be geared towards obtaining a wider field of view 105 whereas others can obtain narrower field of view 105. The camera(s) can adjust the field of view 105 by using different lens, by using a mechanically adjustable lens, or by making digital adjustments to the image 106, such as cropping. As the device 101 is collecting the data 108, it can include image(s) 106 from one or more of the device's 101 camera(s) 2005. Depending on its capabilities, the device 101 can collect data 108 from multiple cameras 2005 simultaneously, or one at a time. The camera(s) can be internal 2002 to the device's 101 enclosure 2001, such as the integrated cameras existing on a smartphone 101, or external to the device 101 and connected to it through a wired or wireless interface 2004, such as by connecting a dash camera to the device 101.

The device 101 can also typically be equipped with a variety of sensors 2006. The sensors 2006 can include a GPS, GNSS, or other location based sensor system 2006a which can rely on satellites, cellular towers, and/or internal position sensors in order to estimate the geographical position (e.g. sensor data 107) of the device 101 using a coordinate system.

The device 101 can also collect other sensor data 107 in addition to images 106. The device 101 can include sensors 2006 such as a gyroscope 2006b, accelerometer 2006c, compass/magnetic sensor 2006d, or other sensors 2006e. The sensors can be individual, fused (such as a rotational vector sensor), or integrated, such as inertial measurement unit (IMU). The sensors 2006 can be digital and/or analogue. The additional sensors 2006 can be internal to the device 101 or connected to it externally, through wired or wireless interface(s) 2004. The sensors 2006 generate the sensor data 107, which is associated with the representative image data 106.

The device 101 can also conduct some or all of the following video or image data 106 related functions: video or image acquisition, decoding, encoding, digital image processing including interpretation and/or programmed analysis of the image data 106, inference (e.g. digital mage processing using artificial intelligence of the image data 106), storage, and/or transmission. It can rely on software, hardware, or a combination thereof. To support image or video based operations (e.g. digital image processing), the device 101 can typically include a Central Processing Unit (CPU) 2007, Graphics Processing Unit (GPU) 2008, or an integrated chipset/processor with equivalent functions. The unit 2007, 2008 can also have additional digital image processing components specialized in video/image functions, as configured and thus utilized by the software components 3000, as further provided by example below. It is recognised that the software components 3000 can be embodied as executable instructions stored on a computer readable medium (e.g. memory 2009, 2010). The device 101 can also typically have working memory/volatile memory 2009, such as Random Access Memory (RAM) for software 3000 operations.

The device 101 can typically store the collected data 108 locally on non-volatile local storage 2010 (such as disk, hard drive, solid state memory, or other types of non-volatile memory) until such time that the device 101 is programmed to transmit 109 the data 108 to the server 111. The non-volatile 2008 memory can also typically store other files 2009 including system files, application files, database files, data files or other types of files. The data 108 can be stored in an encrypted, or non-encrypted manner.

Non-volatile local storage 2010 can either be internal to device 101 within enclosure 2001, or connected to it externally, through a connection interface 2004. In some cases, if additional storage is needed, multiple non-volatile local data storage devices can be connected to a single device 101.

The device 101 can also include a display 2011. The display can be an integrated display electronically coupled with an integrated electronic control system, or an external display, connected through a connection interface 2007. The display 2011 hardware can be just for viewing, or have integrated touch functions as well. The display 2011 can be used for a variety of purposes including: to display the orientation of the camera 112 (view finder), to display a user interface, to display notifications or incidents, to provide access to device 101 functions or settings using a touch-screen interface, and to enable/disable/switch device 101 functions. The processing for the display 2011 functionality can be done through the electronic control system (e.g. as implemented by the processors 2007, 2008), in conjunction with any display 2011 control components that can be found in display 2011 in the case of an external display.

The device 101 can connect to network(s) 110 through a protocol facilitated by one or more network communication module(s) 2012. Examples of wireless interface(s) include, but are not limited to, Wi-Fi and cellular communication networks.

The device 101 and its components 2002 are powered by a power source 2009, which can be located internally (for example, a battery), externally (vehicle alternator, vehicle battery, or other external power source), or both (for example, a smart phone with a battery powered by the vehicle auxiliary plug). The device 101 can be connected to vehicle 102 power circuitry (through connection to fuse, auxiliary interface, usb, or otherwise) 101 to operate for extended period of time. The device 101 can have internal and/or external power regulation, conversion and/or protection components to ensure that the power is available at the appropriate voltage, amperage and in a safe and appropriate manner to the device 101 and its components 2002. External components 2003 can be powered by their own power sources, or can be powered by power source 2009. Similarly, they can be connected directly to the vehicle 102, and can also utilize an internal and/or external power regulation, conversion and/or protection components.

Device 101 can also include other hardware components 2015 that do not fall into the other hardware components listed above. These other hardware components can or can not assist device 101 with carrying out tasks outlined. They can also come in an integrated manner with the device 101. For example, if a smart phone 101 is used, it can come with a wireless power charger. The wireless power charger may not be used actively, but can be present in the device 101.

Figure 1C:
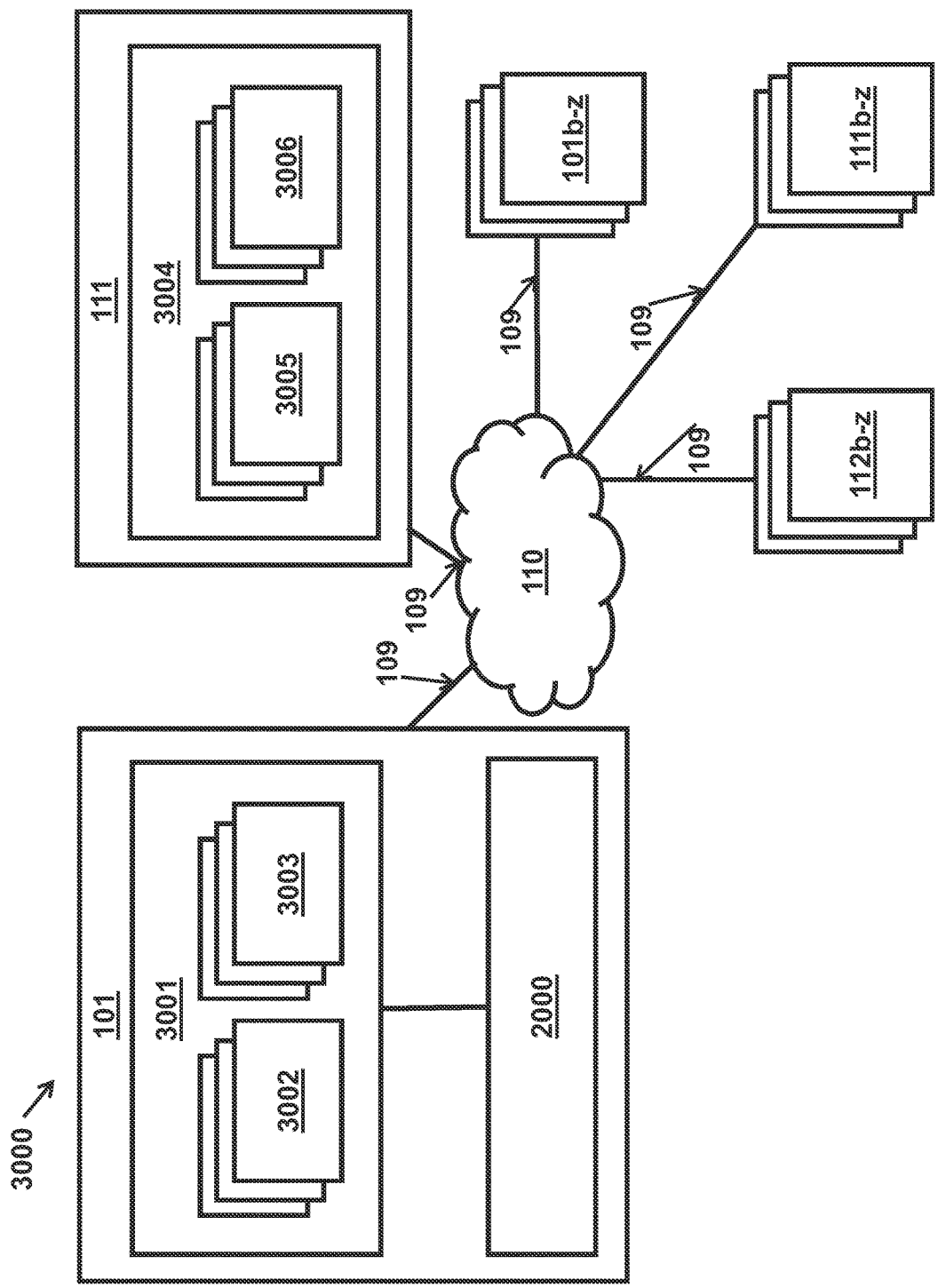
FIG. 1C depicts the communications between the devices, the servers, the clients, and their components of the system of FIG. 1.

Referring to FIG. 1a, FIG. 1b and FIG. 1c, the system can also include software components 3000 across the device(s) 101, 101b-z, the server(s) 111,111b-z and client(s) 112, 112b-z.

Referring to the device 101, the software components 3000, also referred to as software 3001, can include programs 3002 and files 3003. The device 101 software 3001/applications 3002 can include operating system(s), such as Linux, Android, IOS, Windows, or other real time, embedded or other operating systems. It can also include boot loader/bios software 3002. It can also include package management applications 3002, mobile device management software 3002 or other programs, whether custom or off the shelf, related to management and distribution of software 3002 packages 3003. The software 3002 can include IT software 3002, such as remote management applications 3002, anti-virus applications 3002, anti-malware applications 3002, logging/debugging applications 3002, or any other applications 3002 that would facilitate the installation, configuration, operation, monitoring, security, availability, recovery, performance or function of the device 101. The software 3001 applications can typically include files 3003 from which software 3001 instructions, parameters, and/or data are loaded.

The device's 101 software 3001 can typically include one or more applications 3002 (e.g. also referred to as digital processing instructions for use in implementing digital image processing of the image data 106) related to the inspection of the signs 113. The inspection application 3002 can also include additional applications 3002, (running as a separate application/process 3002 or as a sub process 3002), and libraries 3002 and/or component(s) 3002, whether integrated or separate, meant to achieve the device's 101 intended functions. Examples of such software 3001 related to the digital image processing of the digital image data 106 can be stored executable instructions such as but not limited to database(s), image processing components, image processing software, artificial intelligence software, geospatial software, encryption or hashing libraries, data analysis software, and other type(s) of software meant to acquire, process, store and transmit image data 106 in relation to signs 113.

Further, the device's 101 software 3001 can typically include one or more applications 3002 related to the inspection of the signs 113. The inspection application 3002 can also include additional applications 3002, (running as a separate application/process 3002 or as a sub process 3002), and libraries 3002 and/or component(s) 3002, whether integrated or separate, meant to achieve the device's 101 intended functions. Examples of such software 3001 can be stored executable instructions such as but not limited to database(s), image processing components, image processing software, artificial intelligence software, geospatial software, encryption or hashing libraries, data analysis software, and other type(s) of software meant to acquire, process, store and transmit sensor data 107, geospatial data (e.g. sensor data 107), asset data, derivative data or other data in relation to signs 113.

In relation to the device's 101 function for sign 113 inspection, the device's software 3001, including applications 3002 is stored in system files 3003. The sign 113 inspection application 3002 acquires and processes image data 106 and sensor data 107 from the device's hardware 2000, such as camera(s) 2005 and sensor(s) 2006. The application further uses combined and processed data 108, data which is stored locally in files 3003, and/or data sent through the network 110 to undertake inspection functions.

Device 101 can analyze the image(s) 106 through the use of software 3001 and/or operations of image processing 3002, 905 (see FIG. 9), computer vision 3002, 905 and/or artificially intelligent neural networks 3002, 905 in order to label the images 106 or localize and label objects within the images 106. The device 101 can use sensor data 107, previously obtained image data 106, data from other sources, temporal variations in data, or some combination thereof to derive new data (for example, which sign 113 asset object data is related to). The collected data 108 can include data which pertains to sign 113 related objects, such as sign tabs, sign poles, sign mounts, sign strobes, and other such sign related objects that can be attached to a sign 113, or in the proximity of a sign 113. It is recognized that the onboard processing of the acquired images 106 by the software 3001 and related applications 3000 can be used by the device 101 to optimize the transmission of the 106,107 to the remote server 111, thus facilitating improvements in bandwidth network 110 requirements as well as further post processing of the transmitted data 106, 107 by the server 111.

The collected and processed data 108 (e.g. data 106, 107 for a specified location) is then stored locally, on non-volatile storage 2010. The data 108 can be stored in an encrypted, or non-encrypted manner. Any collected and processed data 108 can also be accessed and edited by software 3001 for subsequent data analysis, processing, and derivative data generation and operations.

Collected and processed data 108 is stored on non-volatile storage 2010 until such time for the data 108 to be transmitted 109 by the network communication module 2012 through a network 110 into the server 111 for storage and/or further processing.

The data collected by the hardware 2000 (such as cameras 2005 and sensors 2006 a-e) is processed through the system 100. Once the data 108 has been collected by cameras 2005 and sensors 2006, it is processed by software 3001, optionally with the assistance of artificial intelligence 3002, 900.

Software 3001 also has access to the contents of non-volatile memory, which contains stored data 108 and application software 3002/libraries 3002, files 3003, and any other software components 3001 that it can need to perform its operations. Software 3001 can also relate to the use of hardware 2000 (for example, firmware, drivers, electronic control systems, etc.). The software 3001, can typically work together with various hardware 2000 components including processors CPU 2007, GPU 2008, and RAM 2009, to assist in processing image data 106, sensor data 107, or combined data 108.

The processed data (not shown) is then either re-stored in non-volatile memory 2010, further processed by the software 3002, sent to communication model 2012, or identified by software 3002 as junk data and deleted (e.g. an example of image collection optimization). The device's 101 communication model 2012 is then used to transfer 109 the data via network 110 to server 111 for storage and further processing by server software 3004, which can include its own applications 3005 and libraries 3005, including image processing 3005/905b and/or artificial intelligence operations 3005/905b.

While the current state of the art systems in the field store video, image and sensor data locally until such time it can be transferred to a server, this can result for expansive and potentially costly data transfer 109 requirements and server side 111 processing. The described device 101 and its operation can save on data transmission 109 costs by collecting data points 108 based on different factors which can include (a) distance travelled; (b) time elapsed since last capture (by any device 101); (c) GPS coordinates; (d) objects or labels (e.g. signs 113) detected in images by artificial intelligence operation; (e) associated digital geospatial road asset information; or a combination thereof. The software 3002 determines which data points 108 should be collected and kept, and can delete low quality, duplicate, obsolete or deemed non important instances of data 108.

The device 101 and its operation can prioritize efficient data collection to be used for reporting incidents and calculating metrics, while minimizing data 108 volume for storage and transmission 109 to server 111 using the internet 110. As such, the device 101 could use exclusively cellular network 110 connectivity, wireless network 110 connectivity (such as Wi-Fi), or a combination of the two. The device 101 connects to this network through the network communication hardware component 2000. A component of the device 101 and its operation is that it can be used in a vehicle 102 without the need to remove the device 101, or the necessity to physically connect the device to a workstation computers 112a-z, network switch or a Wi-Fi access point so that the collected data 108 can be transferred and uploaded to the server 111 through the internet 110 directly from the vehicle 102. The device 101 is fully capable of running software 3002 and processing data 108 without a network connection 109.

Similarly to the device 101, the server 111 also contains software 3004. The software 3004 can include programs 3005 and files 3006. The device 101 software 3004/applications 3005 can include operating system(s), such as Linux, Windows, or other other operating systems. It can also include boot loader/bios software 3005. It can also include IT software 3005 (for example, logging software, backup software, anti-virus software, anti-malware, package management, remote management, etc), or any other applications 3005 that would facilitate the installation, configuration, operation, monitoring, security, availability, recovery, performance or function of the server 111. The software 3005 applications can typically include files 3006 from which software 3006 instructions, parameters, and/or data are loaded. The files 3006 stored on the server 111 can also be files 3006 transmitted 109 from the device 101.

The server's 111 software 3004 can typically include one or more applications 3005 related to the inspection of the signs 113, as a subset of the software 3004 and related applications 3000. The inspection application 3005 can also include additional applications 3005, (running as a separate application/process 3005 or as a sub process 3005), and libraries 3005 and/or component(s) 3005, whether integrated or separate, meant to achieve the device's 101 intended functions. Examples of such software 3004 can be database(s), image processing components, image processing software, artificial intelligence software, geospatial software, encryption or hashing libraries, data analysis software, and other type(s) of software meant to process, analyze, store and transmit image data, sensor data, geospatial data, asset data, derivative data or other data in relation to signs 113.

In relation to the server's 101 function for sign 113 inspection, the server's software 3004, including applications 3005 is stored in system files 3006. The sign 113 inspection application 3005 can process image data 106, sensor data 107 and derivative data (e.g. data 106,107 that has been previously processed by the server 111 and/or the device 101) captured by the device 101 and transmitted 109 to the server 111. The application further uses combined and processed data 108 to undertake inspection and inspection related functions.

The server 111 can further analyze the image(s) 106 through the use of software 3005 and/or operations of image processing 3005, 905, computer vision 3005, 905 and/or artificially intelligent neural networks 3005, 905 in order to label the images 106 or localize and label objects within the images 106. The server 111 can use sensor data 107, previously obtained image data 106, derivative data from the device 101 or from other operations, data from other sources, temporal variations in data, or some combination thereof to derive new data (for example, which sign 113 asset object data is related to).

For greater clarity, the term server 111, 111b-z or servers 111, 111b-z would be used interchangeably throughout the description. The server(s) 111 can be physical, virtual and/or cloud based. The server 111 functions can be distributed over one or more physical or logical machines in one or more geographical locations to accommodate different geographies, regulations, processing, scaling, redundancy, availability, computing, functions and accommodate other business, regulatory or IT requirements. It is recognised that the amount and degree of processing of the data 108 collected and transmitted by the device 101 to the remote server 111 can facilitate optimization of data storage and transmission requirements, as desired.

System user(s) can then access the data through a client 112a-z interface. The client 112a-z interface can be a web application that can be accessed using a web browser or a client/server application that uses physical installation to a computer or a smartphone (e.g. device 101). The client 112a-z can typically provide a user interface which facilitates the user to take certain actions, such as using menus, buttons, filters, and other software/web components to search, view, modify, produce report, print, delete, export and otherwise interact with the resultant data.

Device 101 a-z, server 111 a-z, and workstation 112a-z have the ability to communicate 109 through network 110 between each other. In general, device(s) 101 a-z collect data and generate resultant data pertaining to sign assets 113, the data is then communicated to the servers 111*a*-*z* and/or other devices 101*a*-*z*. The server 111, 111*a*-*z* further process the information and resultant data provided by the device(s) and generate its own resultant data. The data collected and/or generated is accessible to the user through workstations 112*a*-*z* and/or clients 112*a*-*z*.

The system components can also be accessible for configuration purposes, for example, a user 112 can upload GIS information such as a sign 113 inventory geospatial database to the server 111, and configure settings and parameters which would be saved on the server 111. The data and/or configuration information would then be transferred to the devices 101*a*-*z* and affect the way in which they operate.

Figure 2:
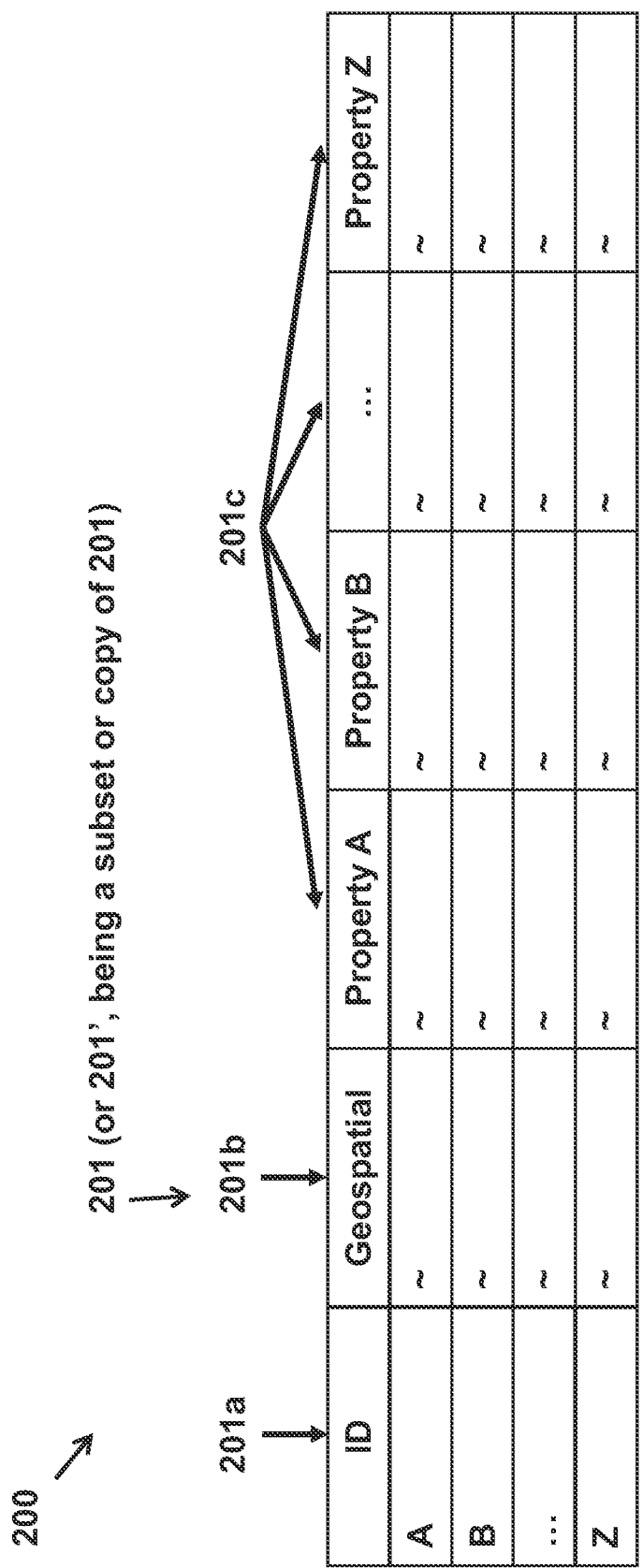
FIG. 2 depicts sample information associated with GIS data of the system of FIG. 1.

Referring to FIG. 2, we have a sample dataset 200 of digitally described geospatial assets 201. The stored data (e.g. in the storage of the device 101 and/or the server 111) can also be referred to as digital assets, GIS assets, digital twins, data points, data shape, or such terms used to describe an asset in a real world on a geospatial information system. GIS Assets 201 can be depicted on a map environment in various ways, including as points, lines, polygons, multi-polygons (a group of polygons). The GIS assets 201 are typically stored for use in a database or in data file format, such as a KML, KMZ, Shape File, GeoJSON, CSV, XML, or other file format which can be used to describe an object within a geo-spatial space. It is recognized that the geospatial assets 201 can be used to describe signs 113 which are physically located in a geographically distributed fashion throughout the territory imaged by the vehicle 102 while using the device 101. As such, once the images 106 and/or sensor data 107 has been processed by the software 3004, the device 101 checks the geospatial assets 201 to see if there is a match (e.g. based on sign type and geophysical location of the result data 108 matching an entry in the list of signs 113 of the geospatial assets 201 for the same geolocation and sign type).

Geospatial Data 201 can have various properties, such as:
a) ID 201*a*: An object ID which represents the asset. This ID is unique to differentiate it from other instances of Geographical Data 201.
b) Geospatial description 201*b*: This field can be actually depicted as one field 202*b* or multiple fields 202*b*, depending on the type of the geospatial representation. For example, it can include individual properties or coordinates for latitude 201*b* and longitude 201*b*, or easting 201*b* and northing 201*b*. Both can be stored in one field 201*b* or each can have their own individual field 201*b*. The values contained in the field(s) 201*b* can include a series of points or values representing geographical coordinates which are used to describe a line, polygon, or multi-polygon.
c) GIS objects 201 can also have other descriptive properties 201*c*. For example, a sign object can also have properties such as the type (such as stop, yield, street name, speed limit, etc.), descriptive name (sign, large stop sign, stop sign on Main street and Yonge street, etc.), owner (the jurisdiction that owns the sign, such as City of Toronto, Township of Orangeville, State of California, etc.), a regulatory code (RA-1, RB-25, etc.), type of sign mounting (on a traffic pole, on a metal pole, on a wooden pole, etc.), direction the sign faces (north, east, south, west), retroreflectivity value, and many other properties. GIS fields 201*c* could also include records such as inspection dates, inspection conditions, installation date, and any other fields. Some of the GIS records 201*c* can also be updated using data collected by the device 101 and/or derivative data generated by the device 101 or the server 111.

The geospatial data 201 can be obtained through data transferred 109 through network 110, from derived data 108, or some combination thereof.

The geospatial data 201 can represent the same object but could be described using different terminology, dialect or slang in different geographies or by different people. For example, the term sign, traffic sign, road asset, and traffic control device can all refer to the same object.

Figure 3:
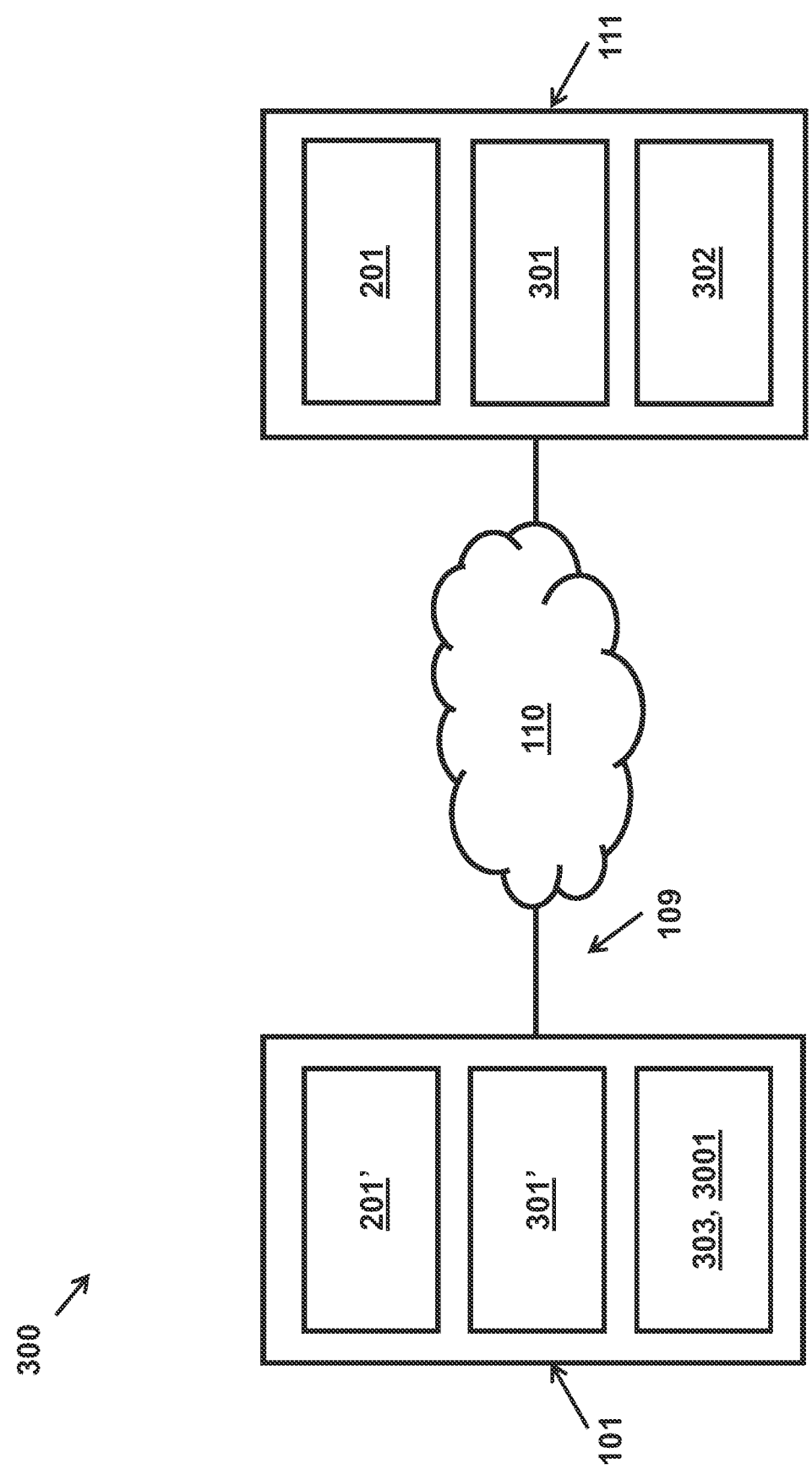
FIG. 3 depicts an embodiment of communications between a device and a server for synchronization of GIS assets data and settings of the system of FIG. 1.

Referring to FIG. 3, the geospatial assets 201 are typically imported to a server 111 and/or stored in a server 111. In general, a server 111 can have a plurality of software 3004 components, including operating system(s), application(s), database(s), file(s) and other software tool(s) or component(s).

The server 111 can typically have one or more database(s) which can store information pertaining to the GIS data 201. The GIS assets 201 can be stored in one or more database and/or in one or more table(s). The server 111 can also store GIS assets 201 of one or more customer(s) in one or more databases or one or more table(s). It can also have the data or portions of the data stored in one or more file(s). The server 111 can also store configuration 301 parameters and/or settings which affect the data collection functions of the device 101 and its operation.

The device 101, by connecting 109 to a cellular network 110, wireless network 110, and/or the internet 110 can communicate to a server 111 and download and retain a copy, or a subset of, the GIS assets 201 and configuration 301 parameters. The server 111 data, such as the configuration data 301 and GIS data 201 can be accessible to the device 101 directly through a database 302 connection or through the server's 111 software 302. The server 111 software 201 can (a) generate files and scripts for the device 101 to download and process; (b) provide for communication protocol(s) or application interface(s) to access the data; or (c) a combination thereof.

The device 101 can have its own database(s) and local storage, located on non-volatile memory 2010, which can store data files. The configuration data 301' and GIS data 201' downloaded by the device 101 can be stored in a database and/or in a file format. The device 101 stored GIS assets 201' and configuration parameters 301' can then be utilized by the device's 101 software 3001, 303 for different data collection and transmission workflows, which can provide for the device 101 to optimize its computing capacity, storage capacity and/or data transfer usage.

The device 101 can identify whether a newer version of the GIS data 201' and/or configuration data 301' is available for download based on parameters such as revision number, time stamp, sequence number, a matching key, or other parameters or programming that can help the device 101 to download the most appropriate data 201', 301'

In the event that device 101 is unable to connect to network 110, device 101 is still able to continue its operation, with any data 108 due to be sent to server 111 being stored on non-volatile memory 2010 until a connection with network 110 is re-established, upon which device 101 can transmit 109 any data 108 that was collected while device 101 was not connected to network 110.

Figure 4:
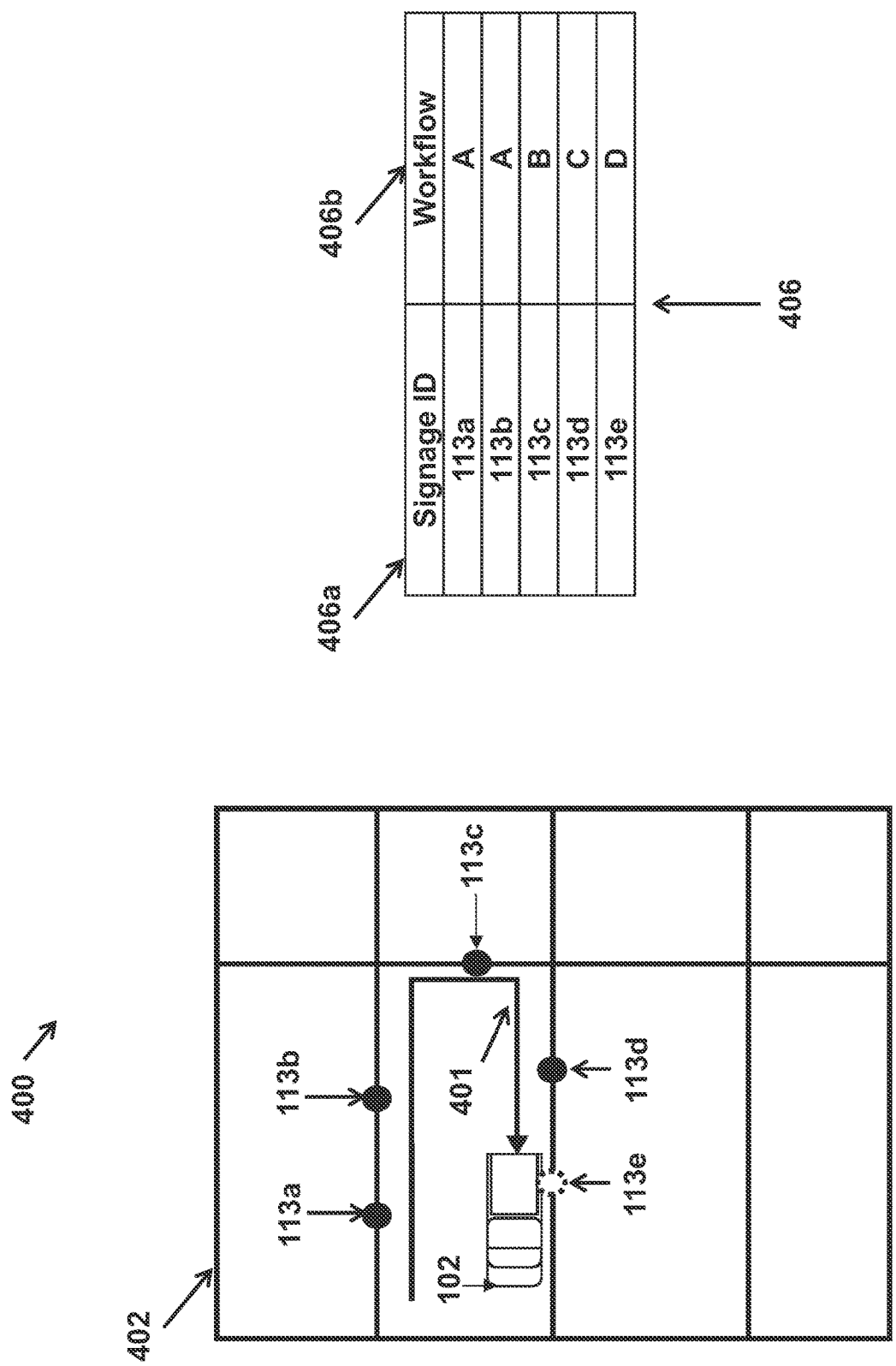
FIG. 4 depicts a sample use case in which a vehicle equipped with a device is using different software workflows on different signs of the system of FIG. 1.

Referring to FIG. 1*a* and FIG. 4, FIG. 4 shows by example 400 different programming and functions of the system as a route 401 is taken by a vehicle 102 equipped with a data collection device 101 on a road network 402. The device 101 can have access to a digital representation of the road network 402, which is stored on the device as GIS data 201'. The device 101 can also have a list of signs as GIS data 201'. The GIS data 201', in this example, includes data regarding signage 113 that is supposed to present, from a database provided by the authority responsible for that particular roadside sign, such as a municipal, stateside, provincial, federal, or private authority.

The device 101, deployed in a vehicle 102 travelling along a roadway 104,402, is analyzing images 106 and sensor data 107. Image processing operations 905 and/or artificial intelligence 905 facilitate the device 101 to identify signs 113 as object data in images 106, for example before transmission of the processed data 108 to the server 111.

As the device 101 is travelling, the device's 101 software 3001 can parse image data 106, sensor data 107, and/or combined data 108, or some combination thereof, collected from field of view 105, to identify potential street signage 113.

Upon detecting potential street signage 113, the device's 101 software 3001, uses the device's 101 sensors 2006 to determine the geographical or geospatial positioning coordinates 107. The sensor data 107 (for example, coordinates and heading), and AI 905 object data resulting from image processing 905 (for example, sign position/coordinates in an image) can then be used by the device's 101 software 303 to identify the most likely sign 113 which the device 101 has detected out of a list of road signs 113 by comparing the sensor 107 data and/or digital processing results of the collected images 106 in the parameters 201c for selected signs 113 in its GIS dataset 201'. As such, it is recognized that the geospatial assets 201' can be used to describe signs 113 which are physically located in a geographically distributed fashion throughout the territory imaged by the vehicle 102 while using the device 101. As such, once the images 106 and/or sensor data 107 has been processed by the software 3004, the device 101 compares the processed data 108 with the geospatial assets 201 to see if there is a match (e.g. based on sign type and geophysical location of the result data 108 matching an entry in the list of signs 113 of the geospatial assets 201 for the same geolocation and sign type).

In addition to the location information 107 and GIS dataset 201', the road signage association can also rely on configuration information 301', geospatial operations, mathematical operations, algorithms, temporal data, other sensor data 107, derivative data or a combination thereof to determine the geospatial sign 113 asset, which the device 101 has identified. The result of the analysis can also be that the device 101 has not identified any sign 113 in the collected image(s) 106, such that the resultant data 108 did not match any of the entries in the GIS data 201'. For example, the device 101 can analyse an image 106 and create no resultant object data (digitally processed image data) for signs 113. The device 101, could also identify a sign 113 but did not manage to associate it with any GIS data 201', as a result of its comparison of the senor data 107 and/or resultant object data (as obtained from digital image processing of one or more selected images 106). This can be the result of a new sign 113 that is not in the GIS dataset 201'. It can also be that the sign 113 is excluded (e.g. missing from the roadside and/or occluded by other adjacent objects—e.g. a tree) from inspection or matching by GIS dataset 201' and/or programming 301'.

As the device 101 detects road signage 113, the device 101 software 303 can utilize some of the various fields within the road segments GIS data 201'. Fields within the road segments associated data 201' could then be used to (a) launch different data acquisition workflows within the software 303; (b) create new derivative data through further software processing 302; (c) be used to specify different conditional statements or cases within a software 303 workflows; (d) load different parameters based on the GIS data 201' fields, configuration parameters 301' or both; (e) combination of all of the options. Once the signage has been identified, the software 303 can then proceed down one of several workflows defined within its operational parameters.

Examples of different workflows/conditions for different signage can include one, some, or all of the following:

a) Whether to acquire all, some, or none of the image 106 and sensor 107 data based on a value contained in the GIS data 201' field of the associated road signage; and/or b) Whether to conduct workflow steps based on a property of the GIS sign asset 201' (for example, when the sign 113 was last inspected by a device 101, or sign type); and/or c) Whether to conduct workflow steps based on configuration settings 301' of the device 101; and/or d) Whether to perform interframe and/or temporal analysis (for example, object tracking);

e) Whether to acquire a whole image 106, or a portion of the image 106 (for example, portion containing the sign 113); and/or f) Whether to change the quality of data acquired based on a value contained in the GIS data 201' field of the associated road segment. For greater clarity, quality means image quality (such as image resolution and image compression), or location reading quality (such as location reading precision, accuracy, or resolution); and/or g) Whether to notify the server 111 of a potentially new road sign 113 in the event that a road sign 113 is detected in a location wherein the software 303, informed by the database 201', did not expect a roadside sign 113 to be located. The software 303 then can communicate with the server 111 to update database 201 information; and/or h) Whether to notify the server 111 when there is no road sign 113 detected in a location wherein the software 303, informed by a database 201', expected a roadside sign 113 to be located; and/or i) Whether match the sign 113 identified in the image 106 by the artificial intelligence 303,905 and software 303 to a GIS asset 201' j) Whether to further process the sign image 106 using artificial intelligence and/or image processing 905 for the purpose of classifying the detected sign object by type (stop sign, stop sign all ways, speed sign, speed sign 40, yield, etc.), which could be identified in the digital images 106 via the digital image processing using physical attributes such as but not limited to colour, shape, etc.); and/or k) Whether to further process the sign image 106 using artificial intelligence and/or image processing 905 for the purpose of classifying the detected sign object by incident type (occlusion, leaning, rust, faded, not-retroreflective, bent, damaged, graffiti/vandalized, etc); and/or l) Whether to store collected data 108, including some or all of the following: image data 106, sensor data 107 and derivative data; and/or m) Whether to transmit collected data 108, including some or all of the following: image data 106, sensor data 107 and derivative data; and/or n) Whether to discards collected data 108, including some or all of the following: image data 106, sensor data 107 and derivative data; and/or o) Other workflows which can pertain to the inspection of signs 113.

In addition to the GIS dataset fields 201', the workflows or software 303 conditions can also rely on configuration information 301', geospatial operations, mathematical operations, algorithms, temporal data, location information 107, other sensor data 107, derivative data 108 or a combination thereof 108, which can affect the device's 101 sign 113 inspection functions.

Table 406 provides a sample use case where different workflows 406b are used on different tracked signage 406a as the device 101 is travelling 401, having detected different signage 113a-e (e.g. actual different signs and/or sign types). In the example provided four different software 303 workflow variants (Workflow A, Workflow B, Workflow C, Workflow D) take place for five signs 113a-e/sign 113a-e types.

Figure 5:
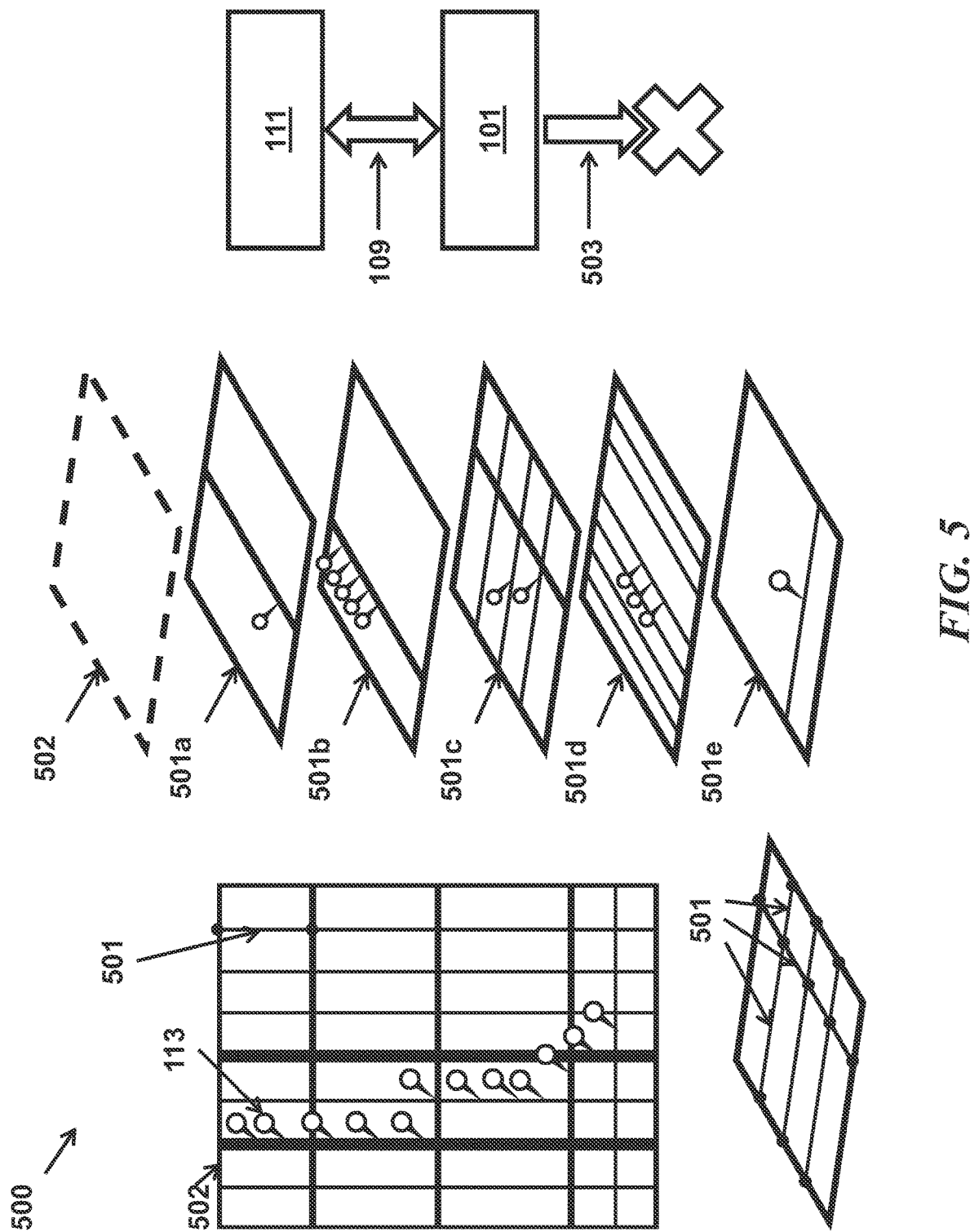
FIG. 5 depicts sample GIS data and how it can be segmented by different properties and used to help and determine which data to send to the server and which data to discard of the system of FIG. 1.

Referring to FIG. 5, we depict a visual representation of a sample GIS dataset 500 (an embodiment of the dataset 201 described above) that is composed of multiple GIS object types, including road segments 501 (e.g. 501a-d), GIS Data geospatial boundary shape(s) 502 (also commonly referred to as a geo-fence or geo-zone), and GIS sign assets 113.

A geo-fenced zone 502 is typically a shape or a polygon that represent the boundaries of a region of interest within a geospatial system. A user of the system can only want to (a) collect data, or exclude collection of data, within a geo-fenced zone 502, (b) to have different workflows within different geo-zones 502; or (c) a combination thereof.

As one example in the context of maintenance of traffic control assets 113, a governmental organization (for example, regional, county, local, single-tier or other types of governments) can only want to capture data of assets within the boundaries of its jurisdiction in order to minimize costs associated with capturing and processing data outside of its boundaries. In another use case, a user can want to capture data "off-road", meaning in areas which do not have road segment 501 representation (for example, user owned parking lots).

The initial GIS dataset 201 is typically stored on a server 111 and can include one or more types of Geospatial dataset(s) 201 that help to determine where to capture data. The server 111 can create a subset 201' of the GIS dataset(s) 201 for local use order to minimize data transmission costs and reduce the storage, processing and computing requirements on the device 101. The device 101 can download 109 the local GIS dataset 201' or the server can upload it 109 to the device 101. The GIS dataset subset 201' can exclude certain road segments 501 based on the values of their property fields. It can also exclude certain properties associated with the road segments 501 which are not likely to be used locally within the device 101.

From a workflow perspective, the road segments 501 could have different properties which would facilitate the device 101 to determine on which road network segments 501a,b,c,d,e to collect data, and in which manner. For example, road segments can have associated fields that represent the traffic volume that they carry, the number of lanes, the type of a road (arterial, feeder, local, regional, county, highway, and other types), along a plurality of additional fields. In some cases, different roads 501 within the same geographical area can be operated or maintained by different legal entities in the public sector or private sector. As such, maintenance of roadside assets 113 can need more frequent or less frequent monitoring depending on what road 501 they are located on, and within which jurisdiction applies to the geo-fenced zone within which they are located.

The device 101 can collect data for two or more separate legal entities simultaneously if it is configured to do so. For example, in a road network 201', there can be private roads 501e, local government level roads 501d, regional or county level roads 501c, state/provincial/territorial roads 501b, and federal roads 501a. As the device is travelling within a certain geographical area, the device 101 can then, for example, collect road signage data only on roads 501c (for example county government roads) and roads 501d (for example local roads) based on an ownership or maintenance property. The device 101 can be programmed not to collect, or to discard 503, all data regarding roadside signage 113 located on roads which it is not programmed to acquire data on (in this example, 501a, 501b, 501e). The data 108 collected can then be transmitted 109 to the server 111 and be made available to users/customers from the associated legal entity.

The signs 113 GIS data 201' can also be inspected based on its own rules. For example, certain signs 113 (such as stop signs) can require more frequent analysis than other signs 113 (for example, parking signs). The signs 113 database 201' can also be segmented by ownership 501a,501b,501c, 501d,501e (if multiple authorities exist within the same boundary), by type (stop, speed, warning, parking, etc.), or by any other GIS database 201' field or layer.

In this manner, the device 101 operation can be configured to acquire image(s) 106 in a particular location, as identified in the GIS data 201', as the device 101 would expect to find the particular sign 113 (or sign type) in that location as listed in the GIS data 201'. As such, the GIS data 201' can be used to direct the device 101 to acquire image data 106 in a selected location(s) (e.g. as identified in GPS sensor data 107 reporting where the vehicle 102 is currently located to the device 101), given the desired inspection time/frequency of the selected sign 113 as defined in the GIS data 201'. In other words, the device 101 could b configured to only acquire images 106 in those locations where the GIS data 201' identifies that a sign 113 is on schedule for image capture 106.

Alternatively, the device 101 operation can be configured to skip acquisition of image(s) 106 in a particular location, as identified in the GIS data 201', as the device 101 would not expect to find a particular sign 113 (or sign type) in that location as listed in the GIS data 201'. As such, the GIS data 201' can be used to direct the device 101 to not acquire image data 106 in a selected location(s) (e.g. as identified in GPS sensor data 107 reporting where the vehicle 102 is currently located to the device 101), given the desired inspection time/frequency of the selected sign 113 as defined in the GIS data 201'. In other words, the device 101 could be configured to skip the acquisition of images 106 in those locations where the GIS data 201' identifies that a sign 113 is not on schedule for image capture 106.

Figure 6:
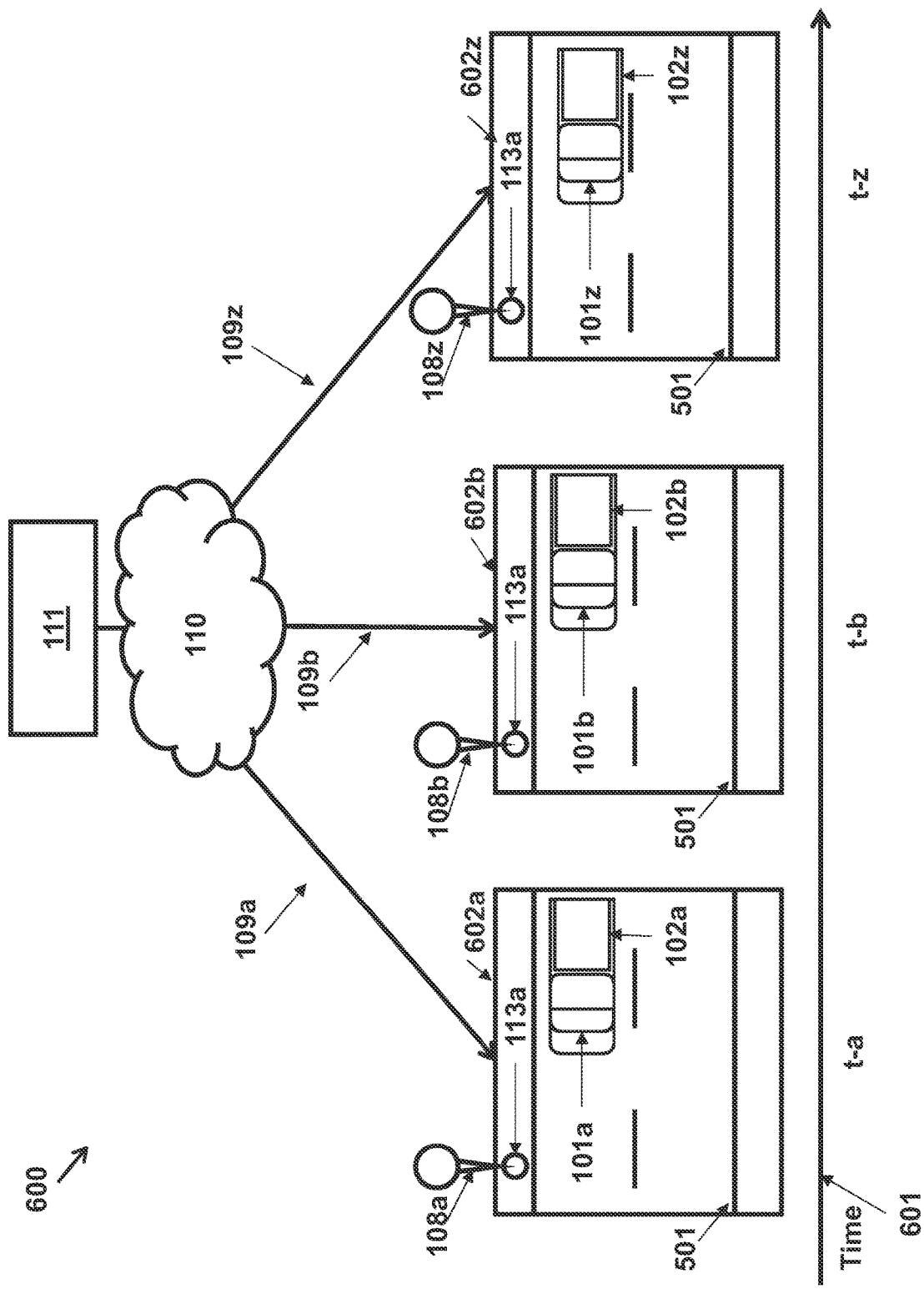
FIG. 6 depicts sample scenarios relating to inspecting signs at different points in time and how it can affect the data collection process of the system of FIG. 1.

Referring to FIG. 6, we have a depiction of a sequence of events 600 related to inspecting signs 113 on a road 501. Over a certain timeline 601 we have a sequence of events 602a,b,z at different points of time t-a,t-b,t-z where a vehicle 102a,b,z equipped with a device 101a,b,c is collecting data points 108a,b,z pertaining to a specific sign 113a while travelling on the road 501. The devices 101a,b,z can communicate 109a,b,z with the server 111 through a network 110 such as the internet. 101a,b,z can also communicate 109a, b, z with each other through the network 110.

The device 101, installed in the vehicle 102, travelling over a section of a road 501 at a given point of time 601 can or can not (e.g. selectively as configured by the GIS data 201') collect data 108 including image 106 and sensor 107 data based on the workflows, the device 101 configuration, and the parameters which are associated with the sign asset 113. The device 101 can or can not generate derivative data 108 including image 106 and sensor 107 data based on the workflows, the device 101 configuration, and the parameters which are associated with the sign asset 113. The device 101 can or can not also store data based on said workflows. Finally, the device 101 can or can not communicate 109 with a server 111, or with other devices 101*b*-*z* to determine which data points 108, if collected, are to be transmitted to the server, partially or in full. The workflows can rely on GIS database information 201, 201' and connectivity information in order to whether to collect and/or transmit the data 108.

The GIS data 201' is consulted by the device 101 (e.g. by the sign data collection software 3004) in order to direct when the device 101 should or should not be capturing images 106, based on the identified actual geophysical location of the vehicle 102 (e.g. and/or direction of travel thereof) acquired through the sensor(s) data 107 and compared to geophysical data resident in the GIS data 201' and the image collection schedule also present in the GIS data 201'.

For example, each sign 113 can have a data property field which determines how often parameters of the road signage 113 needs to be updated (either directly associated with the sign 113, or indirectly, through a configuration parameter associated with a sign property 102*c*). The field can be directly related to data capture interval, or can be a field which is associated with a workflow rule which is using the field data, together with other parameters to determine the data acquisition frequency. The update interval can be constantly or in different increments of seconds, minutes, hours, days, weeks, months or other units of time. Certain signs 113, for example regulatory signs (such as a stop sign), signs on high volume of traffic, signs on roads with higher speed limit, or with ongoing nearby construction/maintenance work can require more frequent updating of its GIS dataset 108, whereas other signs on less used roads can require less frequent update of its captured data 108. Furthermore, certain street signage 113, or certain data parameters of street signage 108, can require more frequent updating than other street signage 113, or certain parameters of street signage 108. For example, a street sign located close to rapidly growing vegetation can require more frequent updating of its visibility than a street sign located in an area with no nearby obstructions. Over time, the same device 101 can survey the sign 113 in different intervals of time t–a,t–b,t–z. This can include consultation with the parameters 201*a*, 201*b*, 201*c* of the device GIS data 201' and/or server GIS data 201.

It could be that at two different points of time t–a, t–b, the same vehicle 102*a*,102*b* with installation of the same device 101*a*,101*b* is travelling on the same road segment 501. In its first trip 602*a* the device 101*a* can capture data 108*a* regarding roadside signage 113, whereas on its second trip, 602*b*, the data 108*b* associated with roadside signage 113 located on road segment 501 might not be due for data collection and as such, the acquisition data 108*b* is not collected and/or not saved. It can also be that a subset of the data 108*b* is sent as opposed for the whole data 108*b*. For example, the device 101*a* can capture, store and transmit an image 106, sensor data 107 and derivative data of the sign 113 on first pass, whereas on second pass the device 101*b* can only capture, store and transmit derivative data (for example, last time the sign 113*a* was seen), but not send image 106 data to conserve bandwidth. It can also be that data capture for the sign 113*a* is not due on the second pass 602*b*, however, the software's 303 artificial intelligence 905 has identified that the sign 113*a* was vandalized by graffiti, and as such, an incident 108*b* can be captured, stored and transmitted even though the sign is not due for data capture 108*b*. This can include consultation with the parameters 201*a*, 201*b*, 201*c* of the device GIS data 201' and/or server GIS data 201.

The device 101 could be configured by the software 3004 to only send image(s) 106 of a selected sign 113 in the event that changes to the character (e.g. physical state) of the sign 113 has changed since the last image acquisition. In other words, the device 101 could decide to take an image 106 of a sign 113 and delete it from the set of collected images 106 (prior to transmission of the collected images 106) in the event that no discernable change (or deviation from the expected condition) was identified by the software 3004 (e.g. using image processing as described herein) given that the particular sign 113 is not scheduled for image acquisition as per the device GIS data 201' and/or server GIS data 201.

It could also be that at two different points of time t–a, t–b, the same vehicle 102*a*, 102*b* with installation of the same device 101*a*,*n* 101*b* is travelling on the same road segment 501. In its first trip 602*a* the device 101*a* can capture data 108*a*, whereas on its second trip, 602*b*, the roadside signage 113*a* is also due for data collection 108*b* and as such, the acquisition data is collected, saved and transmitted. This can include consultation with the parameters 201*a*, 201*b*, 201*c* of the device GIS data 201' and/or server GIS data 201.

It could also be that at two different points of time t–a, t–b, the same vehicle 102*a*, 102*b* with installation of the same device 101*a*, 101*b*, is travelling on the same segment 501. In its first trip 602A at time frame t–a (for example, during day time), the device 101*a* can capture data 108*a* relating to certain parameters, for example image acquisition and incident analysis (occlusion, vandalism, rust, damage, faded, etc.) regarding sign 113. In its second trip 602*b* at a different time frame t–b (for example at night), only certain parameters can be due for data collection for roadside signage 113*a*, and as such only some of the acquisition data 108*b* is collected and/or saved. For example, retro-reflectivity can be analyzed at night time, as such any trips 602*b* taken at night at specific intervals (for example, every month) would capture retro-reflectivity data 108*b*, whereas trips taken during the daytime at specific intervals (for example, weekly) can collect, save and transmit other data 108*a*. For greater clarity, the sign 113*a* can be inspected at different times t–a,t–b for different things and as such, the collected data 108*a*,108*b*, if due or programmed to be sent, can be different. This can include consultation with the parameters 201*a*, 201*b*, 201*c* of the device GIS data 201' and/or server GIS data 201.

The GIS data 201' could be used by the device 101 to configure what parameters of the data 108 collected needs to be transmitted, e.g. all or a portion thereof as specified in the GIS data 201'. For example, only sign reflectivity could be transmitted 109 as one parameter identified in the GIS data 201' scheduled for collection. Alternatively, the entire image 106 frame including the sign 113 could be transmitted, in order to access state of the adjacent area of the sign 113 (e.g. overgrowth of adjacent bushes, etc.).

It could also be that at two different points of time t–a, t–z, a vehicle 102*a* with a device 101*a* is travelling on a road segment 501 making a first trip 602a. Whereas at a later point of time t-z, a different vehicle 102z with a different device 101z makes a separate trip 602z. In such case the device 101z can or can not capture data 108z, and can or can not save and transmit the data 108z, depending whether the roadside signage 113 is due for an updated set of data 108z. This can include consultation with the parameters 201a, 201b, 201c of the device GIS data 201' and/or server GIS data 201.

It could also be that at two different points of time t-a, t-z, a vehicle 102a with a device 101a is traveling on a road segment 501, making a first trip 602a, to collect data 108a regarding roadside signage 113a. Then at a later point of time t-z, a different vehicle 102z with a different device 101z, making a later trip 602z, finds that signage 113a is no longer within device 101z's field of view. Software 2016 can then analyze captured data 108z to determine whether the sign 113a is occluded from view, removed, or otherwise compromised, and thus report the findings of the digital image processing in the transmission 109 of the resultant data 108. This can include consultation with the parameters 201a, 201b, 201c of the device GIS data 201' and/or server GIS data 201.

The above scenarios represent a few example embodiments of the system, and should not be taken as an exhaustive list of possible embodiments. In general, different or same vehicles 102a, 102b, 102c at different points in time t-a, t-b, t-z, with different or same devices 101a, 101b, 101z can capture, analyze, store and transfer data that pertains to one or more signs 113a depending on the devices 102a-z programming and the data which was already collected by said devices 101 a-z. This can also include consultation with the parameters 201a, 201b, 201c of the device GIS data 201' and/or server GIS data 201.

The process of optimizing data transfer 109 between the device 101 and the server 111 can involve some level of analysis from the server 111. For example, the server 111 can keep records of which signs 113a were inspected, what data was captured 108a,b,z, and when t-a, t-b, t-z was it captured and when new data is due when. It can also keep records of derivative data, such as where in the image 106 the sign 113a was captured, images 106 or cropped images 106 of the sign, which road segment 501 the device 101/vehicle 102 were travelling on, the sign 113a geospatial database 201' id, what were the image processing 905 results, which way the sign 103a is facing, what angle the sign 113a is on in relation to the road 501, what type of a pole (wooden, metal, etc) the sign 113a is mounted on, and other such derivative data that could be extracted by using the results of the artificial intelligence operations 905, the sensor data 107 acquisition, and/or a combination thereof. The server 111 can therefore update the GIS data 201 and thus make available the updated GIS data 201' to the device 101, in order to facilitate optimization of the data 108 capture process of the device 101.

The device 101 and the server 111 can be aware of whether road signage 113 is due for an inspection/data collection through a synchronization (whether partial or full) of the device's database 201' with the server's 201. For example, the device 101 can communicate to the server 111 some or all of the following: the sign ID, the sign type, the capture GPS coordinates, the data and time in which it was captured, and other data capture and analysis 108 results such as image inference 905 results and sensor data 107), and the server 111 would then update the appropriate fields in its asset database 201' and determine whether the road signage 113 is due for an inspection/data collection for one or more conditions. In another example, the device 101 can communicate to the server 111 the last time the detected sign 113 was analyzed, either by device 101a or another device 101b-z. The server 111 would then decide whether road signage 113 is due for data collection. The server 111 can then notify the device 101 whether to collect and/or send the data 108. For example, the device 101 can collect data 108 and store it in its non-volatile 2010 memory temporarily until such time that it has connectivity 109 and is programmed to verify with the server 111 whether to send all of the data 108, a portion of the data 108, or discard 503 the data. As such, it is also recognised that the server 111 can provide to the device 101 an updated GIS data 201' in order to augment the data 108 collection process of the device 101 as the vehicle 102 is travelling. Alternatively, or in addition to, the server 111 can send messages 109 (containing information of GIS data or related to GIS data) to the device 101 over the network 110, instructing the device 101 to capture selected data 108 as directed by the message 109 content.

In another embodiment of the system, the devices 101a, 101b,101z and server 111 would all be subscribed to each other's communications 109a,109b,109z using publish-subscribe network protocol that transports messages between devices. Example of such protocol is MQQT, which is an Internet of Things (IoT) light-weight protocol. The protocol typically uses TCP/IP; however, any network protocol that provides ordered, lossless, bi-directional connections can support MQTT. It is designed for connections with remote locations where a "small code footprint" is required or the network bandwidth is limited. In such public-subscribe implementation, all the devices 101a,101b,101z would be able to determine each other's where-about, and determine on an individual basis whether data 108 should be collected.

The connectivity 109a-z of the devices 102a-z at different points in time t-a to t-z and at different locations can not be guaranteed. As such, when connectivity 109a, b,z is uncertain, the devices 102a-z can collect and store data 108 locally on a non-volatile data storage 123, until such time that connectivity 109a,b,z can be restored and the device can determine whether to transmit 109a-z any, all, or none of the collected data 108 to the server 111, based on the device's 101 programming and the available GIS data 201'.

Figure 7A:
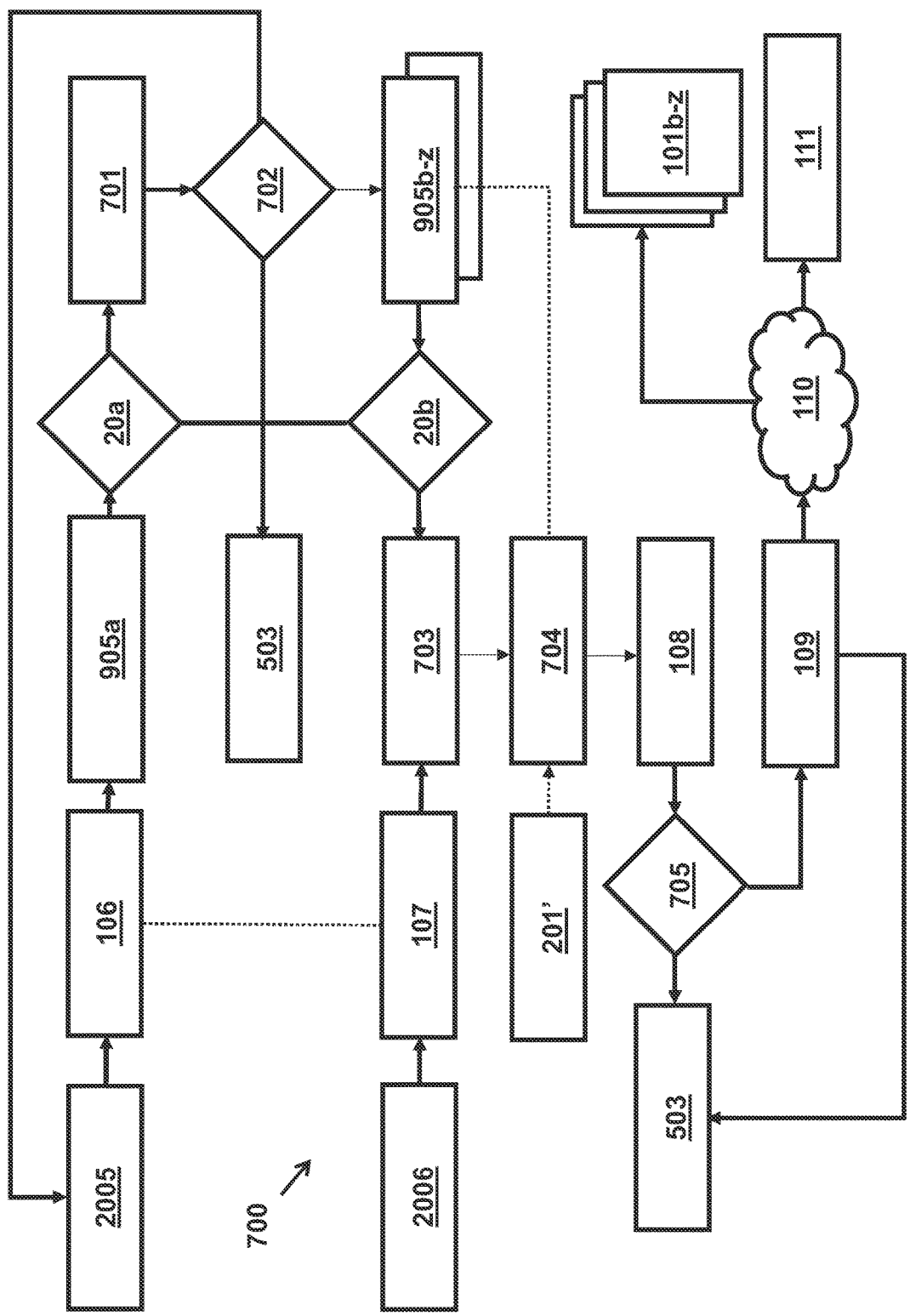
FIG. 7a depicts a sample data workflow on the device, and examples of how the device decides whether to process, store, delete and/or transmit data to a server using the device's software and/or artificial intelligence of the system of FIG. 1.

Referring to FIG. 7a, we have an embodiment of the workflow 700 of software 3001 running on a device 101. The workflow 700 is related specifically to the acquisition and processing of combined data 108, derived from image data 106 collected from camera(s) 2005, sensor data 107 collected from sensors 2006, and derivative data created by the device 101 in relation to inspection of signs 113.

The device's 101 camera 2005 is producing images 106 or a video stream (also considered images 106) which is decoded to images 106. The images 106 content are digitally processed by neural networks 905a to identify objects of interest, such as signs 113 or sign categories (a group of objects which are similar looking, for example, speed signs, warning signs, etc.). The processing results of the image inference 905a can be, for example, a class name or id, bounding boxes (typically represented in some form as X,Y offsets in the image and/or data facilitating the construction of a shape of a rectangle), confidence score and/or any other such data that can be produced by the neural network 905a.

The device 101, typically equipped with the appropriate hardware 2000, such as CPU 2007, GPU 2008, Memory 2009 and storage 2010, can utilize an assortment of image processing and neural network operations 905a-z. These can include object detection, image classification, image segmentation, instance segmentation, landmark detection, optical character recognition, cropping, scaling, thresholding, color space conversions, image filters, and other such operations 905a-z aimed at helping to extract information about a sign 113, as identified in the image(s) 106, or other object of interest from the image(s) 106.

For greater clarity, although depicted as one workflow 700 in the figure, the workflow(s) 700 can represent one process/thread/workflow, or multiple processes/threads/workflows. These can take place within one workflow/process (for example, detect, track, classify, match, store, transmit) or as a separate thread/process/workflow which works in conjunction with the depicted workflow 700. For example, the main application can detect 905a, track 701, 702, and store the image information 106 and corresponding sensor data 107 for further processing. A separate process/thread/workflow can then further process 700 the information, for example using additional image processing 905b-z at a time that the software 303, 3001 is programmed to do so.

As the vehicle 102 is travelling on a road 104, it can do so at a high speed. As image processing operations 905a-z and other processing 700 can have a processing cost to them, too much processing 700 in sequence on the main process while the vehicle 102 is moving can result in missed detections of signs 113. As such, it can be favourable to balance separating images 106 which contain sign object 113, exclude repetition of the same sign object 103, and/or perform further processing 700, 905b-z at another time (for example, when the vehicle 102 is stopped, when CPU or GPU load is lower, on a periodic interval, or on a non-priority process/thread.

If no sign objects as processed 20a are in the image 106, the image 106 is discarded 503. However, if the AI 905a successfully identifies 20a a sign 113 object in the image 106, the data 108 can then be optionally processed by an object tracker 701. An object tracker 701 is a software library or module of the software 3001 that facilitates for correlating multiple object detection results 20a across multiple images 106 and/or inference results 20a and correlating them as a unique object of interest.

The use of a tracker 701, 702 is optional and is depicted in this FIG. 7a. Signs 113, as a traffic control device 113, are also meant to have little variance in them in order to assist in directing/guiding the operation of a vehicle 102. As such, signs 113 are typically very easily detected due to their (mostly) standardized size, color, shape and/or text (per sign type). In order to optimize the workflow 700 and minimize unnecessary processing 700, a sign 113 object can be tracked 701. For example, as a vehicle 102 is approaching a stop sign 113, and coming to a stop, the artificial intelligence processing 905 can identify anywhere from a single few to hundreds of images 106 which contain the stop sign 113. Rather than apply the whole workflow to all the images 106, by tracking 701 the sign 113 object, further processing 700 of the sign 113 can be applied to a smaller subset of one or more of the detected instances 20a of the sign 113. In the event no tracker 701 is used, each object in an image 106 can be treated as its own track.

After a frame 106 is being processed 905a, the object data 20a is being fed to the tracker 701. The software that relates to the tracker 701 then uses operations 702, such as mathematical operations 702, image processing 702 and/or data algorithms 702, which can include some or all of the following: (a) filtering for certain class types for tracking; (b) calculating the intersect over union for objects across different image frames; (c) opening new object tracks once certain criteria is met (for example, when an unmatched object is detected, or when a new object is present for x frames); (d) matching objects to existing or new tracks; (e) expiring a track once certain criteria is met (for example, when a track has no matched object for X iterations and/or y seconds); (f) applying a kalman filter; (g) comparing pixel patterns across multiple images 106; (h) feeding historical object information to tracking neural network 701; and/or (i) other such operations which facilitate to track an object across multiple images captured at different times or places (for greater clarity, this includes tracking algorithm that uses image data 106, object data 20a, or image data 106 and object data 20a.

While an object is being tracked 701, the tracking software 702 can also retain one or more images 106 or portions of an images 106 (for example, crops or expanded crops of images 106 of sign objects 20a). A track is a software variable/object/ID which represents a unique object 20a across multiple images 106, multiple object inference results 20a, and/or over an extended time frame. For each track, some of the image data 106 can be retained for further image processing 905b-z whereas some can be discarded 503. The system device 101 can determine which data to be retained and which to be discarded based on some pre-set criteria, which can be fixed or modular based on the specific circumstance. For example, the tracking software 702 can retain the first image 106, the last image 106, and/or one or more images 106 in between. The selected images 106 can use also other factors such as when the sign 113 was first seen, when the sign 113 was last seen, its position 20a in the image 106, and the size of the detection 20a. Any images 106 which are not retained 702 can be discarded 503.

As objects 20a move outside of a field of view 105, are occluded by other objects (for example vehicles, cars, buildings), and/or are otherwise not detected by the neural network 905a for a certain period of time or certain number of tracking operations 702, the object can be considered expired. Once an object track 701 is expired (no new objects were matched to a track over a certain number of operations or over a certain frame of time), the cropped images can go through additional image processing operations 905b-z. Further processing can also take place based on other criteria which is checked prior to further processing 905b-z—for example, the confidence score of a sign 20a.

The additional image processing 905b-z can be on the whole image 106, or a portion of it to extract additional object data 20b. For example, once a sign 113 is detected, a crop (whether tightly bounded or expanded to include more context) of the sign 113 from the original image 106 can be analyzed by another neural network 905b-z which analyzes the image 106 (for example, by classification) the sign object 20a according to its precise type 20b (for example, stop, speed 40, yield, keep right, school zone, pedestrian crossing white, warning speed bump ahead, warning animal crossing, etc.), or by a category 20b (for example, stop, speed (all speeds), pedestrian, warning (for example, all warnings)). The sign 113 object 20a crop can also be analyzed by another neural network 905b-z that analyzes the sign 113 for certain conditions, for example sign condition is good, sign is improperly rotated, sign rusted, sign leaning, sign occlusion (for example, by vegetation, buildings, signs or otherwise), sign vandalized (for example, by paint, graffiti, stickers, or otherwise), sign broken (for example, bent or chipped), sign faded (for example, faded text, faded paint, or otherwise), sign has low retroreflectivity (for example, dim when in source of light), sign accessories present or missing. For example, sign 113 tabs that are associated with a sign 113, such as "speed" "begins/ends" or "stop" "all way/3 way/2 way"), and/or other such conditions which neural network 905*b-z* can learn given sufficient data. It is recognised that the actual (as recorded and determined in the last image collection process) condition of the sign 113, or expected (e.g. standardized) condition of the sign 113 can be stored in the GIS data 201'. The sign 20*a* objects can also be processed by a neural network 905*b-z* that is specialized in a specific type or condition (for example, stop sign or not stop sign, speed 40 sign or not speed 40 sign, broken sign or not broken sign). Such neural network 905*b-z* can be trained with less classes but more images 106 of a supported class to ensure higher accuracy and reject mistakes done by other neural networks 905*a-z*.

As such, the software 3004 (e.g. neural network 905*b-z*) can be used to identify characteristics of the sign 113 and compare these determined characteristic(s) (i.e. via digital image processing of the image 106 content) to one or more parameters 201*c* stored in the GIS data 201' which are associated with the particular sign 113 under investigation/analysis by the software 3004.

The neural networks 905*a-z* can also include in them "junk" classes, "lookalike" classes, "false positive" classes, or essentially any objects which can be detected erroneously. Junk classes are classes which are not of interest, but can get picked up accidently as traffic signs 113. For example, store front signs, corporate logos, and other items that can accidently get picked up as a traffic sign 113. Lookalike classes are classes which can be of interest for other applications, but accidently get picked up as traffic signs 113. For example, construction cones can get picked-up as construction signs due to similar color. By accounting for such classes/object types in the neural network training, such objects are less likely to be accidently classified/misclassified.

The neural network 905*b-z* processing can be in one or more workflows 700, and can take place sequentially or with other processing functions 703, 704 in between the image processing 905 operations.

In addition to image processing 905*a-z*, the software 303, 3001 can also use sensor data 107 from the sensors 2006. The data 107 can include data such as accelerometer data 107, gyroscope data 107, location/GPS data 107, heading 107, rotational axis data 107, image resolution 107, and other such data that can be collected by the device 101. The data 107, can then be used in conjunction with the object data 20*a*, 20*b* to generate derivative data 703. For example, a vehicle 102 driving with a device 101 can identify 905*a* a sign object 20*a* in front of it in an intersection. The sign object 20*a* can be further processed 905*b-z* (for example, as a stop sign object 20*b*), meaning it is an actual sign 113 and not a mistaken detection 20*a*. The sensor data 107 of the device 101 along with the sign 20*a* position in the image 106 field of view 105 can also be used to estimate the heading/position of the sign 113 in relation to the device 101 (for example, using some or all of the sensor data 107 such as location, device heading, gyroscope, accelerometer, clock, etc.). The derivative data 703 can then be further processed using some or all of the collected and processed data 106, 107, 905*a-z*, 703 to match the sign object 20*a*, 20*b*, 703 to geospatial sign asset 201. For example, knowing about the device 101, location information 107, device heading 107, sign type (for example, stop, speed limit 50, speed limit 100, etc), and the sign relative heading 703 to the device 101, it is possible to match the detected sign 20*a* to a particular GIS sign asset 201' with matching fields (sign GPS position, sign type, etc.).

The derivative data 703 can be a result of processing of both sensor data 107 and image data 106 in order to identify or otherwise generate result data 108 indicative of a particular characteristic of the sign 113, whether listed in the GIS data 201' or not listed. The result data 108 (sign 113 characteristic) can be compared to data resident in the GIS data 201' associated with that particular sign 113, or can be data 108 of a type that is not stored and thus not suitable for comparison with the GIS data 201'. It is recognised that when the result data 108 can be compared with relevant data stored in the GIS data 201', this comparison can be used by the software 3004 to decide whether to transmit 109 any data 108 (e.g. image 106, sensor 107, derivative data 703) associated with the sign 113 to the server 111.

Once the particular sign 113 was matched against a geospatial asset 201, using the comparison, additional processing can take place 704, for example, if it wasn't done so already, the sign 113 image 106 can be analyzed 905*a-z* for incidents. The device 101 can also use information that pertains to the sign 101 to see if it is due for a particular inspection, for example, image capture, sign tab check, retro-reflectivity, or otherwise. It is recognized that, depending on the device's 101 programming 303, 3001, 301') even if a sign 113 is not matched 704, sign incident inspection 905*b-z* can still take place. For example, if a stop sign 113 wasn't matched to a GIS asset 201, but it is broken 20*a*, 20*b*, an alert 108 with an image 106 and sensor data 107 could be generated regarding a stop sign at the device's GPS coordinates 107 as opposed to a matched sign asset 201.

The captured data 108, including image data 106 (or portions thereof), sensor data 107 (or portions thereof), and derivative data 703 (or portion thereof) can then be stored/transmitted 109 to the server 110, other devices 101*b-z*, or both. It is recognized that the data 108 sent 109 to other devices 101*b-z* can be different than the data 108 sent 109 to the server 111. It is also recognized that device 101, depending on its programming 303, 3001, 301' can discard the data 108, either by not saving it 503 (for example, it processing identified the data 108 as junk or invalid), by deleting 503 it before transmission 109 (for example, by learning that the data 108 was already captured by another device 101), or by deleting it after a successful transmission 109.

Figure 7B:
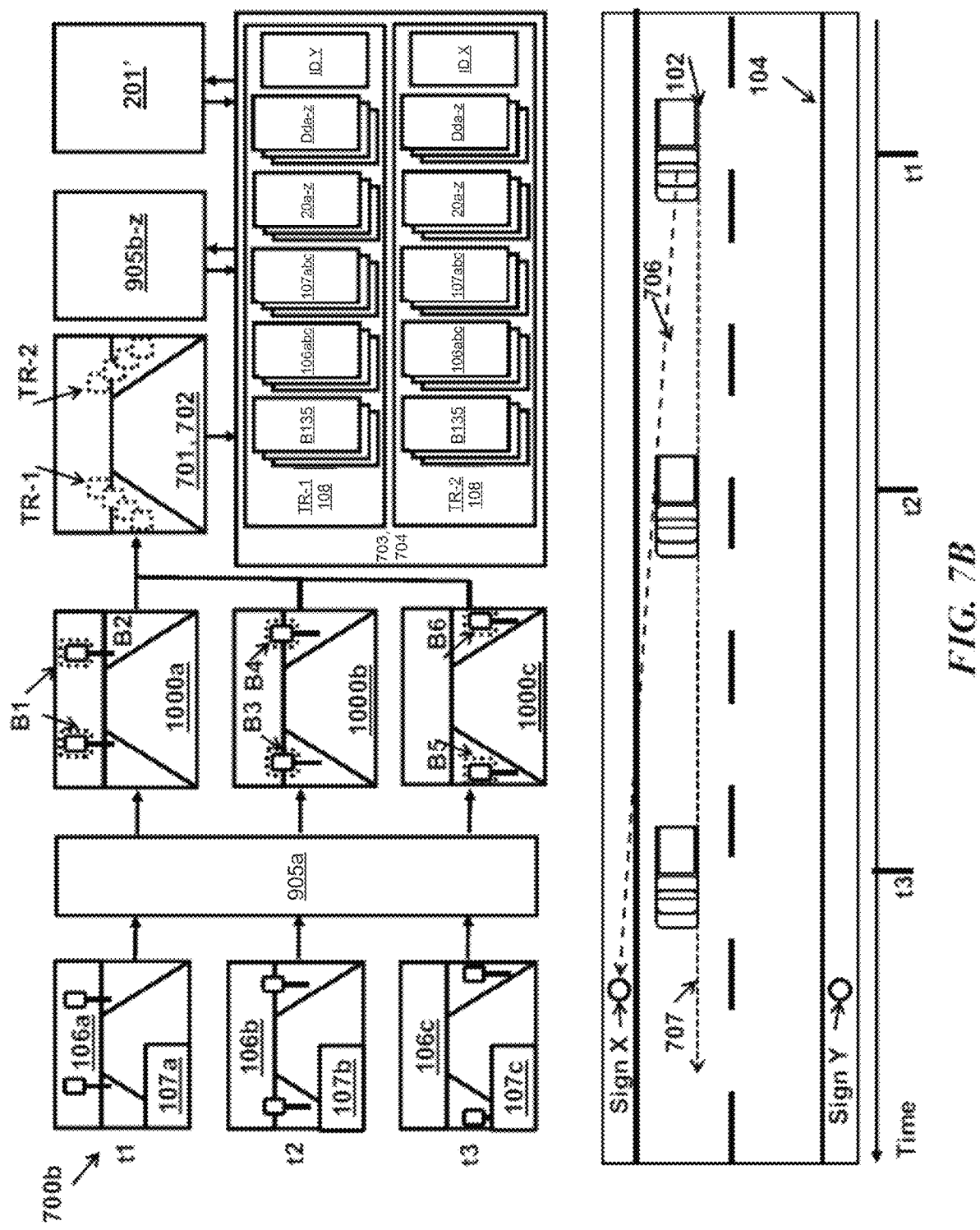
FIG. 7b depicts a sample data workflow on the device, and examples of how the device uses different processes and data to identify a particular sign of the system of FIG. 1.

Referring to FIG. 7*b*, FIG. 7*a* and FIG. 1, show an embodiment of a sample workflow 700*b* representing a vehicle 102 equipped with a device 101 driving along a road 104 and collecting data 108. The vehicle 102, at different point of times t–1, t–2, t–3 is approaching two signs—sign X (to the right of the vehicle 102) and sign Y (to the left of the vehicle 102). At point t1, the device 101 captures an image 106*a* with associated sensor data 107*a*. At point t2, the device 101 captures an image 106*b* with associated sensor data 107*b*. At point t3, the device 101 captures an image 106*c* with associated sensor data 107*c*. Each image 106*a-c* is processed by a neural network 905*a* that is trained to identify 20*a* signs in images 106. In this case, the device 101 is programmed 303, 3001 to produce bounding boxes (along with other outputs, such as class name and confidence). However, the device 101, depending on the neural networks used 905*a-z* and its configuration 301' can also generate object data 20*a* in other format, such as masks, polygons, points, lines, or other geometrical data format. For image 106*a*, the inference results 20*a* include boxes B1, B2. For image 106*b*, the inference results 20*a* include boxes B3, B4. For image 106*c*, the inference results 20*a* include boxes B5, B6. In this case, the bounding boxes B1,B2,B3,B4,B5, B6 are used by the tracker 701, 702 to establish tracks for the right facing sign (sign x) and the left facing sign (sign y).

Each sign 113 can have one or more tracks 701 which are associated with it. In this example there is only one track 701 per sign 113, however, missed detections 20a and occlusions (for example, by vegetation, poles, cars, etc) can result in the tracking 702 algorithm generating multiple tracks 701 per sign 113. Referring to track TR-1, the bounding box information B135, along with images 106abc can generate one or more crops which can be used by neural networks 905b-z to extract additional derivative data 20a-z. For example, a crop can be used to identify the type of TR-1 sign as a stop sign. Depending on the situation, it can be suffice to use one neural network 905b-z operation on one crop, one neural network 905b-z operation on multiple crops, or multiple neural networks 905b-z on multiple crops. For example, more image processing 905b-z operations on larger number of samples 106abc can result at a higher accuracy per track at a larger computational cost.

The bounding box information B135, in relation to the image data 106a,b,c can show that the sign 113 for TR-1 is approaching to the right of the vehicle 102 in the images 106a,b,c. The sensor data 107a,b,c associated with the images 106a,b,c can establish the heading 107 of the vehicle 102 based on GPS breadcrumbs history 107a,b,c, compass information 107abc, or other data sources 201', 301', 303 accessible to the device 101.

The device 101 software 3001 can take combined image 106a, 106b, 106c and sensor data 107a, 107b, 107c across time t−1, t−2, t−3 and create derivative data 704, 108 about signs 113. For greater clarity, we depict two signs 113 for simplicity but similar operations can take place across one or more signs simultaneously. This can include signs on one or more sides of the road, one or more signs on a pole (or other mounting options), one or more overhanging sign(s) on the top, and other possible sign configurations.

The device 101 can use the information 108 associated with each track 701, and associate it with a specific sign 113. It can use some or all of the following to make said association: (a) bounding box information B; (b) image data 106abc; (c) sensor data 107; (d) object data 20a-z generated by neural networks 905b-z; (e) geospatial data 201' (including various properties 201'c); (f) correlation Dda-z between the device's 101 field of view 105, bounding box position, device's 101 location information 107 and sign location information 201', and (f) other generated data Dda-z generated by the software 303, 3001 (not shown). For greater clarity, generated data Dda-z can be generated from data pertaining to a particular point in time t, or temporal variation in data across time t1, t2, t3, etc.

Referring once again to our example in FIG. 7b, one example of identifying a particular Sign X can follow a series of steps. For example, the vehicle 102 is travelling on a road 104 and collecting image 106a,b,c and sensor 107a,b,c data across time t1,t2,t3. The image data 106a,b,c, processed by a neural network 905a, identifies two signs—one on the left (B135), and one on the right (B246) in the images 106a,b,c. The bounding box data B1,2,3,4,5,6, processed by a tracker 703,704, creates two tracks, TR-1 and TR-2. Track 1 is associated with bounding boxes B1,3,5, which are moving towards to the right of the images 106a,b,c over time t1,t2,t3, meaning they are approaching the vehicle 102 on its right. The bounding box information B135 and images 106a,b,c associated with the track TR-1 can also be processed by a neural network 905b-z which would specify that the sign 113 is a stop sign 113. The vehicle 102/device 101 heading 107, temporal trajectory 107a,b,c could be used, along with other available data to derive the direction 107 in which the device 101 is moving along the road 104. The software 303, 3001 can then refer to its database 201' of signs/geospatial assets, and query/search for signs 113, within a certain proximity to the device's 101 current location 107, which are to the "right" (this could mean north, east, south, west, etc.) of its current path of movement 707 over a certain period of time t1,t2,t3. Sign Y could therefore be eliminated for TR-1 based on various criteria, such as: (a) being too far; (b) being "left" of current heading 107 and/or trajectory 707; (c) being of a different sign type (not "stop"), if that is the case; and (d) sign Y position in relation to the device's 101 field of view 105. By applying a process of elimination based on set criteria (or applying AND logic based matching criteria), it is possible to associate TR-1 data 108 with Sign X. The process for TR-2 and Sign Y would be similar. For greater clarity, this is but one example and it is recognized that for different scenarios, curvature of the road 104, present signs 113 and their types, etc., different workflows, steps, criteria and data can be potentially use to improve the accuracy of the matching logic 700b. It is also recognized that some of the steps in the workflow 700b can be executed in a different order than what is shown. It is also recognized that some of the steps can be present or not present in the workflow 700b depending on the implementation of the software 303, 3001, programming 301' and/or database 201'. It is also recognized that some of the steps in the workflow 700b could take place in series or in parallel and by one or more threads or processes.

Once the information for a specific Sign X is matched 700b the associated data 108 for it can be sent to the server 111 and other devices 101b-z based on the device's 101 programming.

The device 101, can also be programmed to send information 108 pertaining to a track TR-1,2 even if it was not successfully matched to a specific sign 113 in the asset database 201'. For example, if a sign 113 is deemed damaged 20a-z by a neural network 905a-z, but is not successfully matched to a specific sign ID, the data 108 can still be sent 109 to a server 111. The system 101 can also send captured signs 113 (whether matched or unmatched) to a server 111, for further analysis, for data collection purposes, for archival purposes, or for some other reason. The system 101 can also send captured signs 113 (whether matched or unmatched) to a server 111, for the purpose of collecting sign 113 image 106 data (whether all signs, some signs, sign categories, and/or specific sign types) for the purposes of using the collected sign data to train neural networks 905, s905.

For greater clarity, said collection of sign 113 image 106 data can take place concurrently with the device's 101 function as a sign 113 inspection device 101. The sign 113 image 106 data collection process can be part of the device 101 programmable workflows 700a, 700b. The sign 113 image 106 data collection process can also follow separate workflows 700a, 700b on the device 101. Furthermore, the image 106 data collected and transmitted by the device 101 to the server 111 for the purpose of AI 905, s905 training can be stored as files 3006 on the server 111. The files 3006 can then be downloaded, accessed or otherwise used for the purpose of building image 106 datasets, including data annotations (for example, bounding box, keypoints, polylines, mask, labels, etc), to be used with neural network training operations which generate trained weight files, model files, or other such files used by neural networks 905, s905 to process images 106.

Referring to FIG. 7c, FIG. 7a, FIG. 7b, and FIG. 1c the data 108 collected by the device 101 can include some or all of the following: image data 106, sensor data 107, object data 20a-z, derivative data Dda-z and object identifiers (ID).

The collected data 108, if programmed to do so, is then transmitted 109 to the server 111 over a network 110/the internet 110.

The data 108 can include one or more image 106 and/or one or more crops of image(s) 106 containing one or more sign(s) 113. It is recognized that the device 101, being of a hardware design such as an embedded computer 101, smart camera 101, or a smartphone 101, can have specifications which are not as powerful as those of a server 111. It is also recognized that the server 111 computing capabilities, including those related to image processing s905-*az*, and other processing capabilities (such as CPU, GPU, disk, and other related hardware) can be more easily superior to those of the device 101 (for example, due to access to more memory space and computing power).

The device 101, intended to capture data of interest 108 pertaining to signs 113, is programmed to discard 503 data which is not of importance (For example, images 106 not containing signs 113, portions of images 106 not containing signs 131, data captured outside of geographical zones and/or off-road, duplicate data such as multiple instances B of same sign 113, data which was already captured by other devices 111*b*-*z*, and other data which can be deemed unnecessary by the device 101 based on its programming). As such, the device 101 can be programmed in a manner which assists it in maximizing its true positive rate (for example, capturing and transmitting data that is of interest 108) and true negative rate (for example, discarding 503 data that is not of interest), and minimizing its false positive rate (for example, capturing and transmitting data that is not of interest) and false negative (for example, missed data of interest).

For greater clarity, discarding data 503 (on either the device 101 or the server 111) can mean several things, depending on the workflow 700*a*,700*b*,700*c*, which can include one or more of the following functions: (a) deleting all or some of the data 108; (b) excluding the data 108 (for example by cropping the data 108 or substituting the data 108 with other data); (c) marking the data 108 for removal in a database or a file, even if not removed immediately; and (d) excluding the data 108 from presentation to the user which collected the data 108. The discarding 503 can take place on the device 101 prior to sending 109, the server 111, or both.

One factor of relevance is the sampling rate of the device 101, which is the rate at which the device 101 can collect and process 108 data. Image processing 905*a*-*z* is a typically computationally expensive process, and as such, too much inference 905*a*-*z* operations on the device 101 or otherwise complex analysis functions can result in dropped 503 frames 106 (and can also include corresponding sensor 107) data. This is data is that inevitably dropped 503 irrespective of whether or not it includes data of interest 108. As such, it can be favourable to apply certain operations 905*a*-*z* on the device 101 to filter 503 the majority of the collected data 108 using less operations 905*b*-*z*, while facilitating for potential error to be addressed through additional processing 700*c* on the server 111. The server 111 can use different and/or better image processing s905*a*-*z* than the device 101. It can include higher quality or quantity of artificial intelligence models s905*a*-*z* to be applied to the images 106. It can also perform more complex geospatial 201' or sensor 107 analysis functions than the device 101.

Figure 7C:
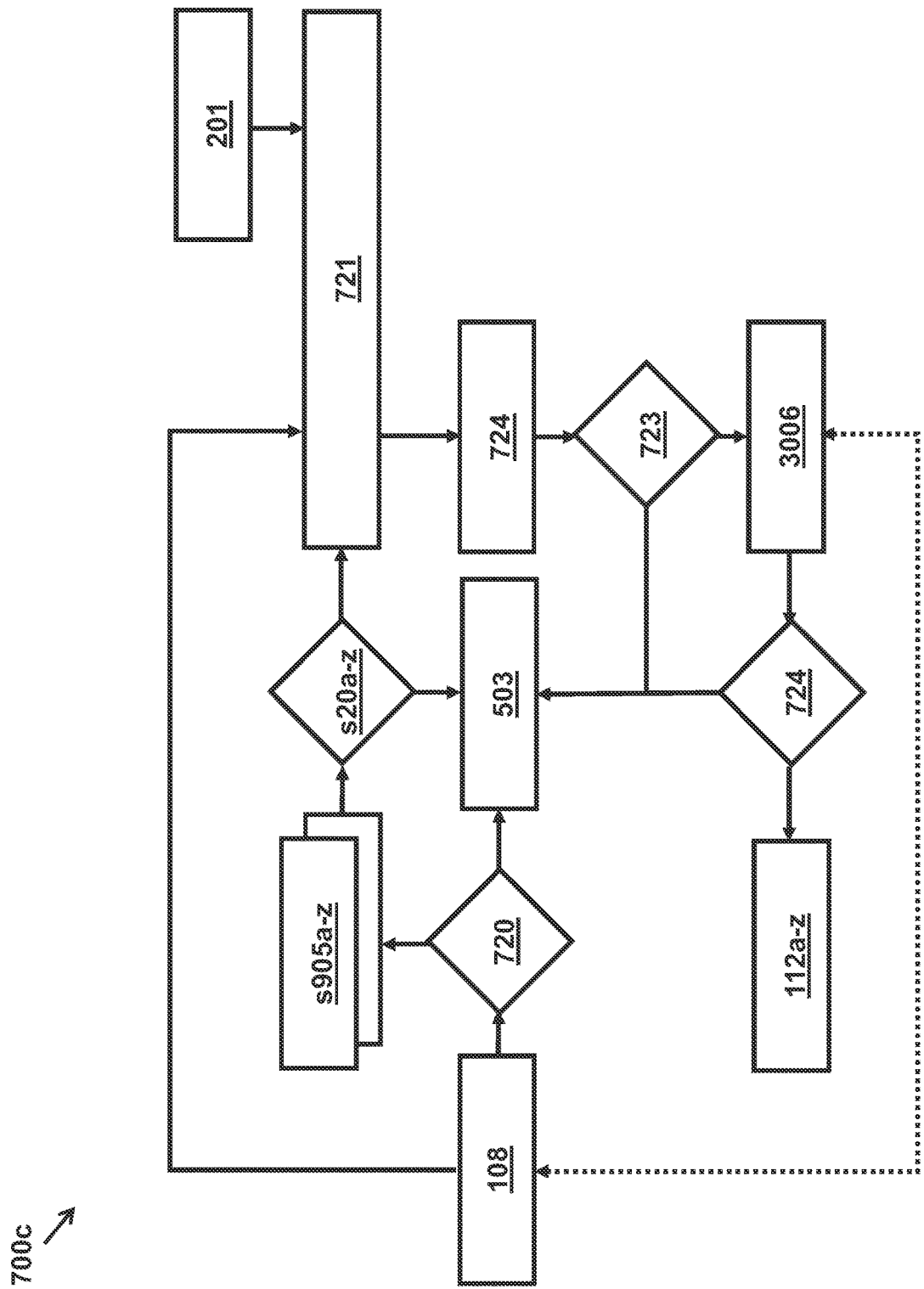
FIG. 7c depicts a sample data workflow on the server, and examples of how the server decides whether to process, store, delete data using the server's software and/or artificial intelligence of the system of FIG. 1.

In FIG. 7*c*, we show a sample server side data 108 processing workflow 700*c*. This can, for example, be used in consultation with the contents of the GIS data 201 associated with the identified sign(s) 113. Once the data 108 is transmitted 109 to the server 111, the data 108 can be stored in system file(s) 3006 and/or database(s) 3006 and/or in memory (not shown). The data 108 can typically (but not in all cases) be further processed before being made accessible to the user(s) through the client interface(s) 112*a*-*z*.

The data 108 could be analyzed 702 for reasons to be discarded 503. This can be used, for example, in consultation with the contents of the GIS data 201 associated with the identified sign(s) 113. Discarding data 108 could happen for a variety of reasons including potential duplication (for example, multiple images 106 from one or more devices 101*a*-*z* referring to the same sign 113), corrupt or partial data 108, or other logic to identify unnecessary data to discard 503.

The server 111 side discarding 503 analysis can also include server 111 side image processing s905*a*-*z*. These can include object detection, image classification, image segmentation, instance segmentation, landmark detection, polylines, optical character recognition, cropping, scaling, color space conversions, image filters, and other such operations 905*a*-*z* aimed at helping to extract object data s20*a*-*z* about a sign 113 from an image 106. This process can also, for example, take place in consultation with the contents of the GIS data 201 associated with the identified sign(s) 113.

The image processing s905*a*-*z* operations can be used to confirm existing information (for example, see if the inference result s20*a*-*z* on the server matches inference results 20*a*,20*b* on the device 101). The image processing s905*a*-*z* operations can also be used to extract additional information s20*a*-*z* about the sign 113 (for example, if a sign 113 is classified 20*b* as a speed sign 113 on the device 101, it can be further classified s20*a*-*z* as a speed "50" on the server 111). The image processing s905*a*-*z* operations can also be used to check for the absence of an object data s20*a*-*z* of a sign 113 (for example, a stop sign can also have an "all way" sign tab 113 present under a stop sign 113. The device 101 could be collecting image data 108 containing stop signs 113 whereas the server 111 could check images 106 for the presence or absence s20*a*-*z* of the associated sign tabs 113). The image processing s905*a*-*z* operations can also be used to inspect the sign 113—for example, by measuring the retro-reflectivity s20*a*-*z* of the sign 113. The image processing s905*a*-*z* operations can also detect for the presence of additional signs 113 in the image 106*a*, and initiate server workflows 700*c* for them. The image processing s905*a*-*z* operations can also extract other information s20*a*-*z* about the status of the sign 113, such as it if it is in a good condition and visible, or if there are issues with it (i.e. graffiti, vegetation, occlusion, damage, fade, rust, and other conditions of concern).). This process can also, for example, take place in consultation with the contents of the GIS data 201 associated with the identified sign(s) 113.

Depending on the results s20*a*-*z* of the image processing operations s905*a*-*z*, the image can be discarded 503. For example, if a sign 113 object data 20*a*,20*b* is initially detected by device 101 image processing 905*a*-*z* pertaining to a stop sign 113, but on the server 111 the image processing operations s905*a*-*z* are detected as a restaurant sign (or other object which is not of interest), then the data 108 can be discarded. Another example can be that the data 108 transmitted 109 by the device 101 indicate an incident (such as graffiti), whereas upon further image analysis s905*a*-*z* on the server 111, the results s20*a*-*z* indicate that the sign 113 is in good order. This process can also take place, for example, in consultation with the contents of the GIS data 201 associated with the identified sign(s) 113.

The server 111 can also employ additional analysis steps 721 which use some or all of the device 101 collected data 108, server 111 object data s20a-z, geospatial assets data 201 and other data 301 (not shown). The analysis 721 could for example, undertake more precise matching algorithms using the sensor data 107, object data 20a-z, derivative data Dda-z, server object data s20a-z to match more precisely (for example, using more precise server side 111 geospatial software) the data 108 to a sign 113 database 201 ID. The analysis 721 could also use temporal data 108a-z to suggest updates to the database 201. For example, if the same data 108 is reported across different points of time t–z or devices 101a-z, showing the same result (for example a speed sign), at a similar location 107a-z (or a cluster of locations 107a-z within a certain distance), yet there is no corresponding speed sign in the database 201, the analysis 721 can suggest the addition of a new sign 113 to the database 201. The analysis 721 can also match signs 113 which were not detected by the device 101 AI 905a-z, but are present in the image data 106, and as such, can be matched to a sign 113 ID in the database 201 using a similar matching workflow 700a, 700b to the device 101 but excluding tracking data 703,704 (which can not be available on the server). Once processed, the server 111 processed 721 data results 724 can include some or all of the device 101 collected data 108 plus data generated by the server 111. This process can also take place, for example, in consultation with the contents of the GIS data 201 associated with the identified sign(s) 113.

The resultant 724 data on the server 111 can be further analyzed 723 for the purpose of determining whether to discard 503 the processed data 724 or store it 3006, (for greater clarity, the data 724 or portion of it can be stored also throughout the workflow 700c, however, for depicting that the processing 700c is substantially completed for the workflow 700c we depict a step showing storage 3006 near the end). The further analysis 723 can to one instance of collected data 108 processed 724 or multiple instances of collected data 108a-z collected and processed 724. For example, multiple devices 101a-z at different points in time t–z can all send data 108a-z pertaining to the same sign 113 and the server 111 can determine 723 which data 724 to store 3006 and which to discard 3006. This process can also take place, for example, in consultation with the contents of the GIS data 201 associated with the identified sign(s) 113.

The stored 3006 resultant data 724 can also be reviewed by a person (for example, a data technician, system user, business analyst, subject matter expert, etc) through a client 112a-z, which can similarly approve the resultant data 724, reject the resultant data 724, update the resultant data 724, and determine whether the data 724 is discarded 503 or made available to other users through clients 112a-z. An embodiment of this system can also have further controls over the different types of users accessing the data through client 112a-z. These controls can include facilitating certain users to only access certain types of data, facilitate them to only view but not otherwise edit the data, or other administrative control systems, whose specifics would be determined on a case by case basis. This process can also take place, for example, in consultation with the contents of the GIS data 201 associated with the identified sign(s) 113.

Referring to FIGS. 7a, 7b, 7c, the device 101 can operate to identify a sign 113 (or a plurality of signs 113) by being configured as a mobile system for collecting data 108 associated with signs 113 along a roadway 104 and for transmitting 109 resultant sign data over a communications network 110 to a server 111, the server 111 located remotely from the system, the system comprising: at least one device 101 having: at least one camera 2005 for obtaining digital images 106 of the sign 113 as the system moves along the roadway 104; at least one sensor 2006 for acquiring sensor data 107; a network interface 2000 for sending and receiving data over the communications network 110 to the server 111 during operation of the system on the roadway 104; and a memory 2000 having stored instructions 3001 thereon for execution by a computer processor 2000 for: receiving the digital images 106 of the data 108 and processing the digital images 106 using image processing instructions 3004 of the stored instructions 3001 in order to determine object identification data of the sign 113 in the digital images 106; receiving sensor data 107 of the data 108 from the at least one sensor 2006 indicative of geolocation information associated with the sign 113; comparing the geolocation information and the object identification data to contents of a geospatial sign database 201' in an effort to identify the sign 113 in the geospatial database 201'; generating the resultant sign data 108 based on the comparing; and sending the resultant sign data 108 to the server 111 over the communications network 110.

Figure 8:
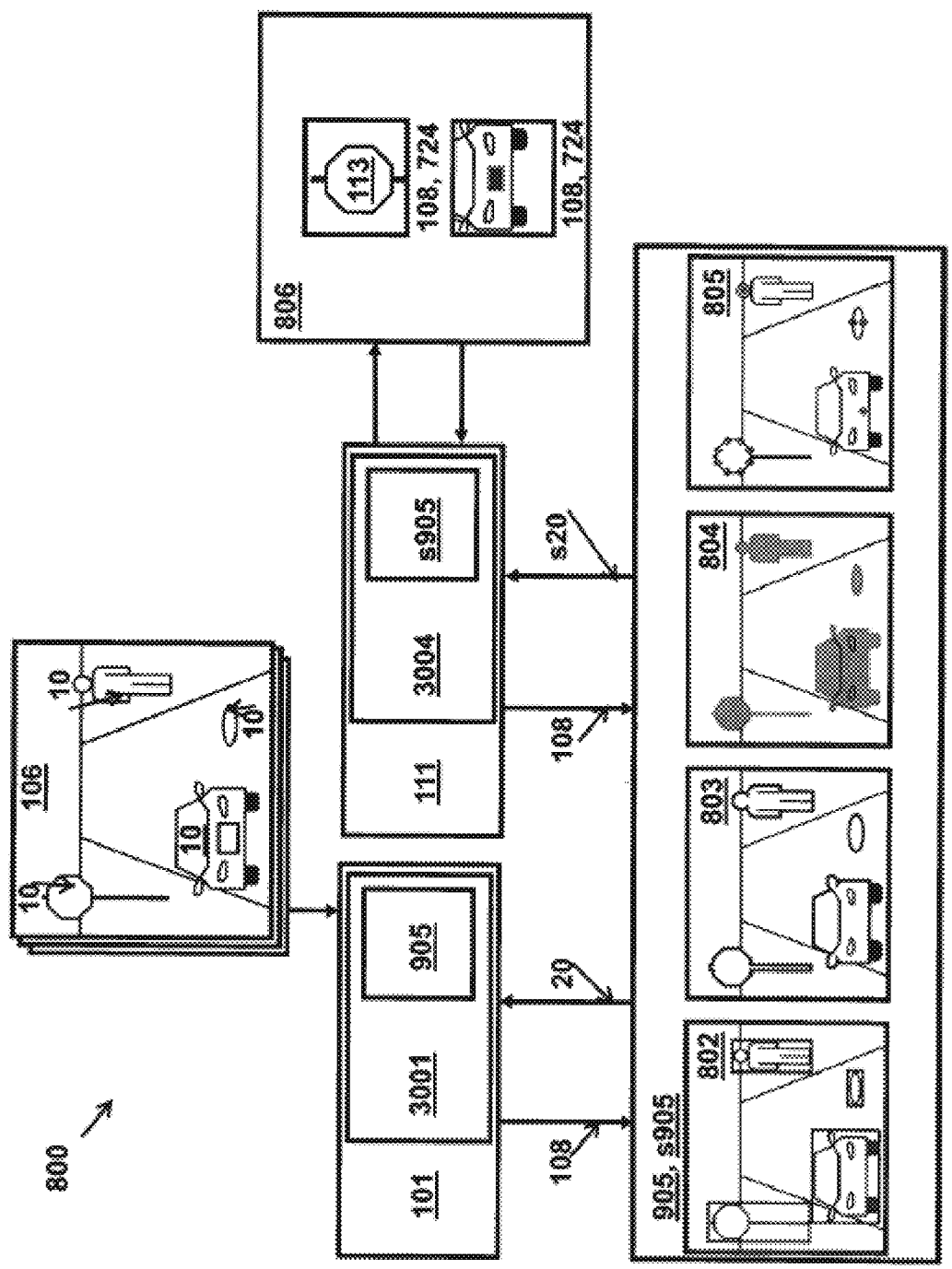
FIG. 8 depicts data which can be generated by artificial intelligence operations on images on the device and the server, and examples of different types of data which can be collected from images of the system of FIG. 1.

Referring to FIG. 8 and FIG. 1c, the device 101 software 3001 and the server 111 software 3004 can generate 800 object data using artificial intelligence 905, s905 via processing of the image 106 content and/or sensor data 107. The software processing 3004 can take place on the server 111, the device 101 or both. The system can execute the software instructions 3001, 3004 (including the artificial intelligence neural network(s) 905, s905) for AI analysis of image data 106, sensor data 107, or a combination thereof 108, including object detection 802, image/object classification (not shown), polygon outline 803, instance segmentation 804, key-point 805 identification, and other image processing operations 800 (not shown) of image data 106 and objects of interest 113 in the acquired images 106 in order to infer 905, s905 (e.g. determine) information about object(s) 113 in images 106. Examples include the position of the object 113 in the images 106 and/or other characteristics of the object 113 and/or image 106. As a result of the software 3001, 3004 operations and image operations 905, s905 new derived image, sensor, and/or object data 20, s20 and AI processed image, sensor, and/or object data 20, s20 can be generated. It is recognized that to optimize data transmission, it is preferable to perform AI operations 905 on the device, so that the resultant data 108 could be used to determine whether to discard or transmit data 108. It is further recognized that the device 101 can not have sufficient processing capabilities and as such, depending on a variety of factors, including the hardware device 101 capabilities and as such AI processing functions s905 can also take place on the server 111 to supplement the device's 101 inspection functions. As such, it is further recognized that the AI operations 905, s905 can take place on the device 101, the server 111 or both.

Software 3001, 3005 are also capable of identifying specific features located within the image metadata and initiating specific workflows 700a,700b,700c to manipulate 806 the image 106 depending on the features 20,s20 identified. For example, road signage 113 can be identified 20, s20 and cropped, then saved as a separate instance of data 108, 724 to be saved, processed or transmitted on the device 101 or the server 111. This cropped image data 108, 724 can then be used for further image processing operations 905, s905 within software 3001, 3004 or accessed on a workstation 112a-z.

Software 3001, 3004 is also capable of identifying features of image data 106, sensor data 107, combined data 108, or processed data 724 that can need to be altered, cropped out, removed, or discarded in accordance with applicable privacy laws, jurisdictional borders, or other applicable rules and regulations. An example would be if the image data 106 captures a vehicle's license plate (or other personal identifying information, such as a person's face, a house, etc.), software 3001, 3004 on the device 101 or server 111 could potentially identify it as such, and could manipulate the image 806 to blur, censor, or otherwise digitally obscure the license plate 108, 724 as to render the sensitive information illegible and irrecoverable within the edited image data.

Figure 9:
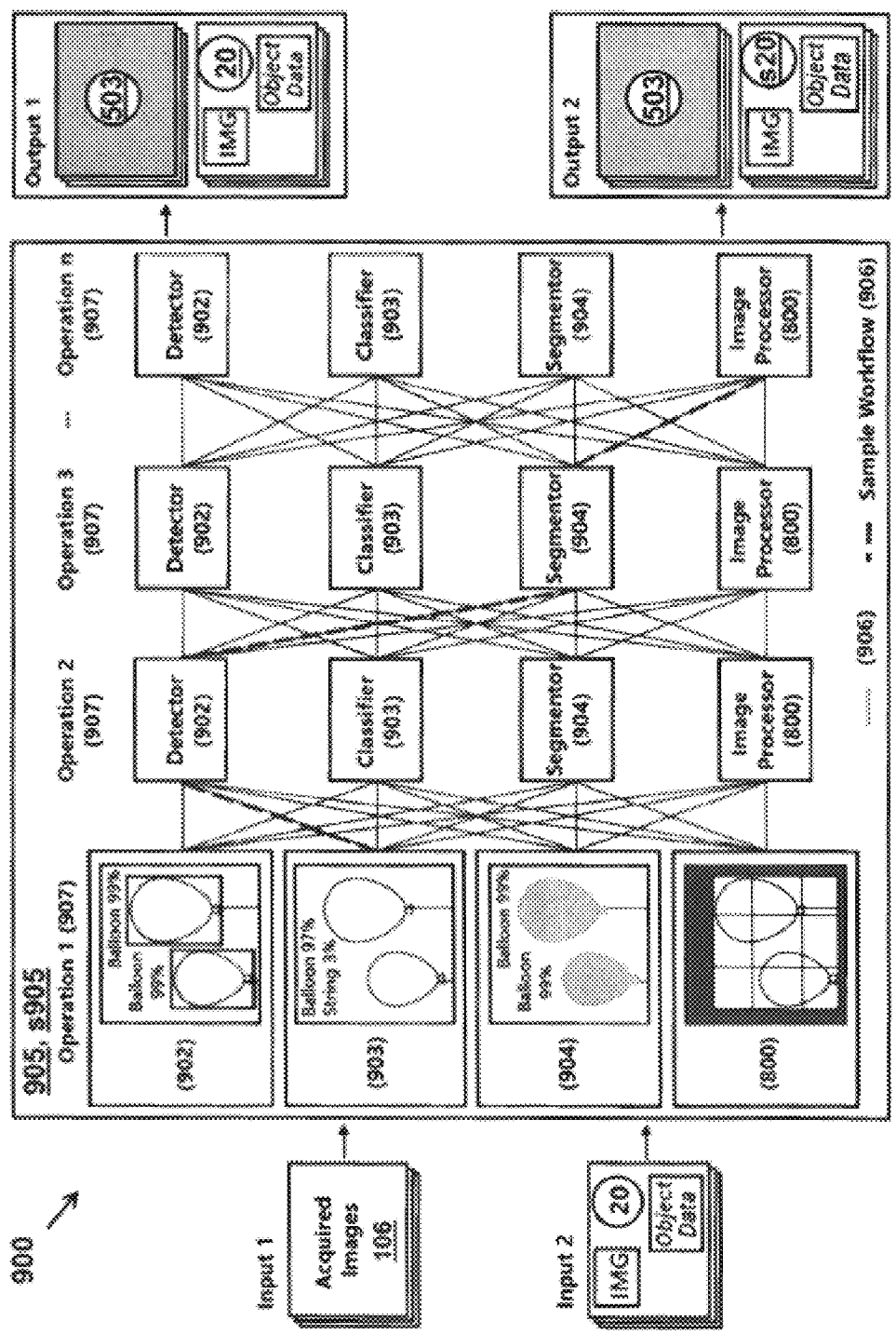
FIG. 9 depicts image processing and/or artificial intelligence operations and workflows, and how they can be used to generate new data and discard data of the system of FIG. 1.

Referring to FIG. 9, shown is an example of image processing system 900 implemented by the software 3001 (including the image processing instructions 905, 905a-z) on the acquired images 106, in order to produce the processed image data 20 to be included with the AI data 108 transmitted to the server 111. It is also recognized that the example of image processing system 900 implemented by the sign software 3004 (including the image processing instructions s905, s905a-z) on the resultant image data 20, in order to produce the processed image data s20 to be included with the processed data 724 generated by the server 111.

The software 3001, 3004 can include image instructions 905, s905 (e.g. including artificial intelligence neural networks), for image 106 processing and inference for flexible workflows 906 inclusive of operations 907 such as neural network(s) 905, s905 inference including detection 902, classification 903, segmentation 904, and image operations/ AI operations 800 in order to discard data 503 as well as the resultant processed image and sensor data 108, 724. For greater clarity, discard data 503 can be full images 106, or portions of frames 106 deemed by the AI 905,s905 and software 3001, 3004 to not be worthy of storage 3003, 3006, transmission 109, or further processing by the software 3001, 3004.

It is recognized that the workflows 906 can include a plurality of different numbers/combinations of the operations 907 in any order, as configured in the image processing instructions 905, s905, in order to identify, classify, segment or run AI analysis on any of the image(s) 106 under consideration. Other image processing operations can include cropping, color space conversation, resizing, or other AI functions (for example, key point/landmark identification). One image 106 can have several different image processing workflows 906 applied to it. The object(s) of interest 10, including signs 113 are also referred to as classes 10. The class 10 refers to one of the output categories for the object(s) of interest 10. For example, they can include but are not limited to: pothole 10, car 10, person 10, sign 10, and other objects 10 which relate to assets 10 that require inspection. The network(s) 905, s905 can detect, classify, and/or segment one or more classes 10 (also referred to as object(s) 10 of interest) in the image 106. It is recognized that other supplementary functions can take place in the encompassing software 3001,3004, for example object tracking 703,704, analysis of sensor data 107, image modifications 806, or other software 3001, 3004 functions in conjunction with the image processing 905, s905 functions.

It is recognized that the identified 20 objects(s) of interest 10 are included in the processed image data 108 while discard data 503 is excluded from the processed image data 108, as one embodiment of the system, such that the processed image data 108 and the unaltered sensor data 107 is transmitted to the server 111.

Furthermore, it is recognized that the identified s20 object(s) 10 are included in the processed image data 724, while the discard data 503 is excluded from the processed image data 724, as one embodiment of the system as implemented by the server 111.

Furthermore, it is recognized that that the identified s20 object(s) of interest 10 and discard data 503 are included in unprocessed images 106 and unprocessed image data 106 is sent to the server 111 by the device 101 (including sensor data 107). Once received, then the server 111 would then process the images 106 as processed image data 724 while the discard data 513 is excluded from the processed image data s20, as one embodiment of the system as implemented by the server 111.

Typically, image(s) 106 acquired by the device's 101 camera(s) 2005 are available in some initial resolution, color space, and formatting. It is expected that in many cases, the image(s) 106 can need to undergo image processing 900 operations to optimize their compatibility with the neural networks 905, s905 used and the object(s) 10 of interest which they are trained to identify 20, s20. Some examples of image processing operations are resizing or adjusting resolution, field of view adjustments, cropping, and/or color space conversion. Other image processing 900 operations can include artificial intelligence functions 900 such as keypoint/landmark detection, polygon detection, and other neural network functions that extract information 20, s20 from images 106.

As such, the image processing 900 operations can include the resolution of the image 106 can be set based on the available resolutions present on the camera 2005 device, whether available as resolutions or as a name representative of the resolution. Further, the field of view 105 can be adjusted via adjusting the optical zoom levels of the camera(s) 2005. Further, the field of view can be adjusted by a digital zoom process, wherein the picture 106 is magnified and only the parts of the image 106 that remain within the original dimensions are processed. Further, the region of interest in the image 106 can be set. Once set, the region of interest can be cropped. Further, the image processing can include color space conversion, whether from one space to another, or adjusting the formatting, order and/or channels of the utilized color space.

For example, the processing instructions 905 (e.g. neural network 905, s905) can be defined as a set of functions, operations and/or instructions which facilitates for the system 900 to train itself (not shown) based on annotated datasets, commonly referred to as "ground truth". Once trained, the system 900 can then infer on new datasets. This process is known as machine learning. The neural network(s) 905, s905 utilized in the system 900 can be primarily geared towards inferring images 106 and deriving new information 20, s20 (for example, identifying object(s) 10 of interest in images 106 for automated incident identification and reporting). Once processed using the image processing instructions 905, s905. Further, software 3001, 3004 is configured to derive additional insights by associating the sensor information 107 (e.g. including geo coordinate data) for each of the images 106 and/or objects of interest 10. It is recognised that during the processing of the images 106 using the image processing instructions 905, s905, some of the image 106 data acquired can be discarded in view of the discarded image 106 data can not be required by the software 3001, 3004, or can be redacted. It is recognized that image data 106, sensor data 107, combined data 108, or processed data 724 that can be discarded can be referred to as discarded data 503 such that discarded data 503, is not transmitted 109 over the network 110 to the server 111, or can be discarded on the server 111 before becoming available to be accessed by user through a workstation 112.

The neural network(s) 905, s905 utilized can have a plurality of architectures which pass the image 106 through a sequence of layer operations (not shown) which are aimed at aggregating, generalizing, manipulating and/or modifying the information of another layer for the purpose of inferring, detecting, classifying, marking and/or segmenting objects 10 in images 106. Operations executed by neural network(s) 905 include but are not limited to: (a) convolution; (b) rectification; (c) fully connected; (d) pooling layer (e) bottleneck and/or (f) loss layer.

The architecture of the system 900 can be a neural network 905, s905 architecture such as: (a) single shot detector (SSD), (b) you only look once (YOLO), (c) convolutional neural network (CNN), (d) region-based convolutional neural network (R-CNN), (e) fast region-based convolutional neural network (Fast R-CNN), (d) faster region-based convolutional neural network (Faster R-CNN), (e), mask region-based convolutional neural network (Mask R-CNN), (f) region-based fully convolutional networks (R-FCN), or other published or proprietary neural network 905 architectures.

When a neural network 905, s905 is trained on an image set, it can set certain parameters commonly known as weights. The parameters, or weights, are typically stored in a model file, or weights file. The neural network 905, s905 utilized in the system 900 can be trained using published, well known, weights files as the basis. For example, MobileNet (such as MobileNetV1, MobileNetV3, MobileNetV3, or newer), Inception (such as InceptionV1, InceptionV2, InceptionV3, or newer), VGG, or other popular pre-trained networks, and can be composed of different number of layers (for example, ResNet50, ResNet101). However, the concept of such pre-trained neural networks 905, s905 is similar whereas a base architecture with base weights is modified whereby one or more of the last or final layers is modified to detect or classify a set of objects 10 of interest, which can be identical, exclusive, partially inclusive, or fully inclusive of the original trained objects and can include new objects not present in the original neural network 905, s905. Neural network(s) 905, s905 can also be of a proprietary custom architecture with weights or parameters which are trained from scratch.

The neural network(s) 905, s905 can be utilized as a detector 902. A detector 902 typically identifies an object 10 of interest in image(s) 106, and the location of the object 10. The location of the object 10 is typically in the form of a bounding box represented by coordinate(s) and/or distance(s) in relation to a point of reference 902 in the image 106. A detector 902 can also provide a score, typically known as confidence, which represents how sure the neural network 905, s905 is in the object 10 detection.

The neural network(s) 905, s905 can be utilized to extract landmarks 800. Landmarks are points of reference in a known object 10. For example, in the context of a detector identifying a sign 113, the bottom of the sign pole and the top of the sign pole can be landmarks 10. Such landmarks can then be analyzed to derive further information about the status of a sign 113—for example, whether it is leaning or not.

The neural network(s) 905, s905 can be utilized as a classifier 903. A classifier 903 has a list of potential classes, or object types, which it is trained to identify in a picture. When processing image(s) 106, a classifier 903 typically returns a list of potential object(s) 113 in the image 106, sorted by the model's confidence of their presence in the image 106. The neural network(s) 905, s905 can be utilized as a segmentor 904. A segmentor 904 typically segments image(s) 106 into regions. The regions are then typically predicted to belong to a certain class 10, or type, which facilitates to extract a mask, or a pixel blob, that represents the class 10. A segmentor 904 can also separate instances of the object(s) 10 into separate object(s) 10 representing one or more classes 10. For example, a segmentor 904 can identify a sign 110, and also the shape of the sign 113, which can facilitate to estimate if it is broken.

The neural network(s) 905, s905 can be designed and/or optimized to be used on the device's 101/server's 111 GPU, CPU or both. The workflows 906 can utilize one or more neural network(s) 905, s905, and the neural network(s) 905, s905 can be used in a sequence. For example, One neural network(s) 905, s905 can responsible for detecting 902 objects and/or regions of interest in the image(s) 106, and one or more additional neural network(s) 905, s905 can be responsible for classifying 903 the objects 113 and/or regions of interest already detected in the image(s) 106. For example, a neural network 905, s905 can detect 902 a sign 113, crop it with image processing 800, and then another neural network 905, s905 classifies 903 it as a stop sign. It could also be used to verify that the first detection is correct. For example, the first neural network 905, s905 can detect 902 a sign 113, crop it using image processing 800, and pass it to a classifier 903 which confirms it is a sign 113 and not a traffic cone. In some situations, this process provides the opportunity to classify 903 the object 10 of interest using a higher resolution, since the detector 902 can infer on a scaled down version of the image 106, whereas the cropped image 106 would be inferred at a higher resolution.

One neural network 905, s905 can be responsible for detecting 902 objects 10 and/or regions 113 of interest in the image(s) 106, and one or more additional neural network(s) 905, s905 is responsible for detecting 902 additional objects 10 and/or regions 10 of interest in the already detected area(s) of the image 106. For example, a neural network 905, s905 detects a sign 113 and then another neural network 905, s905 detects an "all way" tab on the sign 113. One neural network 905, s905 can be responsible for detecting 902 objects 10 and/or regions 10 of interest in the image(s) 106, and one or more additional neural network(s) 905, s905 can be responsible for extracting landmarks 902 from the objects 10 and/or regions 10 of interest in the image 106. For example, a neural network 905, s905 detects a sign 113 pole 10, and then another neural network 905, s905 can identify its topmost point and bottom-most point, and return those in a coordinate format respective to the image 106, or in a coordinate format respective to the object/region 10 of interest, facilitating to understand if a sign is tilting.

Further, the neural network inference can be processed on the device 101, server 111 or both using the respective GPU or CPU. The neural network 905, s905 can infer multiple classes 10 simultaneously. Furthermore, one or more of the neural networks 905, s905 can be simplified by approximating the neural network to floating-point numbers for the purpose of reducing the memory and processing requirements. Such reduced neural networks, sometimes known as Quantized neural networks, are then used on the Device 101 CPU.

One or more image processing 900 workflows can be used within one or more workflows 700a, 700b, 700c. Furthermore, one or more instances of the collected data 108 can be processed by one or more image processing workflows 900 or software 3001, 3004 workflows 700a, 700b, 700c. Furthermore, one or more instances of the processed data 724 can be processed by one or more image processing workflows 900 or software 3001, 3004 workflows 700*a*, 700*b*, 700*c*.

In view of the above, the device 101 via the software 3001 and other onboard components such as the sensors 2006 and the camera(s) 2005 can find signs 113 in the environment of the vehicle 102 (e.g. within the field of view 105). In particular, the device 101 is configured via the software 3001 to utilize a geospatial database 201' and can match the signs 113 identified in the data 108 (i.e. via image processing) to an entry in the geospatial database 201'. Once identified, depending upon the configuration of the software 3001 and/or the contents of the GIS database 201' for the identified sign 113, the device can exclude redundant data from the data 108 subsequently transmitted 109 to the server 111 (for example, multiple images of the same sign, or images of sign which are not due for inspection). Once identified, depending upon the configuration of the software 3001 and/or the contents of the GIS database 201' for the identified sign 113, the device can exclude some of the data 108 (and can generate new object data) through object tracking and subsequently transmit 109 the new object data to the server 111.

It is to be understood that the invention(s) is/are not limited to the described embodiment above, as said embodiments can be amended, modified, or otherwise altered without departing from the scope of the present invention.

We claim:

1. A system for collecting data associated with signs of different sign types along a roadway and for transmitting resultant sign data over a communications network to a server, the server located remotely from the system, the system comprising:
   a mounting component for mounting at least one mobile device to a vehicle;
   the at least one device having:
      a housing for coupling to the vehicle by the mounting component;
      at least one camera provided in the housing for obtaining digital images of the signs of the different sign types as the system moves along the roadway;
      at least one sensor provided in the housing for acquiring sensor data;
      a network interface for sending and receiving data over the communications network to the server during operation of the system on the roadway; and
      a memory having stored instructions thereon for execution by a computer processor for:
         receiving the digital images of the data and processing the digital images using image processing instructions of the stored instructions in order to determine object identification data of a sign in the digital images;
         receiving the sensor data from the at least one sensor indicative of geolocation information associated with the sign;
         generating comparison result data by comparing the geolocation information and the object identification data to contents of a geospatial sign database in an effort to identify the sign in the geospatial database;
         generating the resultant sign data based on said comparing, the resultant sign data including the comparison result data; and
         sending the resultant sign data to the server over the communications network.

2. The system of claim 1, wherein the image processing instructions identify signs and sign related objects in the digital images and generate object data pertaining to the content of the digital images, the object data included in the resultant sign data, the object data including identified sign type of the sign from the different sign types.

3. The system of claim 2, wherein the image processing instructions exclude discard data from the object data, the discard data pertaining to at least some image content of the digital images.

4. The system of claim 1, wherein the image processing instructions include one or more neural networks configured for identifying the sign in the digital images.

5. The system of claim 1, wherein results of the image processing instructions can include one or more the following: (a) an object which is the sign; (b) an object which is sign related; and (c) an object which is not the sign and is not sign related.

6. The system of claim 1, wherein the results of the image processing instructions are used to identify incidents related to the identified sign.

7. The system of claim 1, wherein the results of the image processing instructions are used to track an object using an object tracker.

8. The system of claim 1, wherein the data collected includes at least one, some or all of the following: (a) digital image data; (b) the results of the image processing instructions; and (c) the sensor data associated with the image data.

9. The system of claim 1, wherein the system generates derivative data for an object of interest in the digital images other than results of the image processing of the digital images and the associated sensor data.

10. The system of claim 1, wherein the system uses the results of the image processing instructions and the sensor data to determine information specific to the identified sign.

11. The system of claim 1, wherein the geospatial sign database represents a dataset defining a plurality of signs, or signs and related assets, and related data.

12. The system of claim 11 wherein the system determines whether to collect the data, not to collect the data, or to collect some of the data at a given point in time for one or more geospatial assets listed in the geospatial sign database.

13. The system of claim 11 wherein the system matches a plurality of signs identified in the digital images listed geospatial assets in the geospatial sign database, said matches using at least the results of the image processing and the sensor data.

14. The system of claim 13 further comprising: said comparing failing to identify the sign in the geospatial sign database; and adding the data about the sign to the geospatial sign database as a new geospatial asset of the geospatial sign database.

15. The system of claim 1, wherein at least one, some or all of the following data pertaining to signs and related objects of interest is accessible to a user accessing the server via a client: (a) the data collected by the device; (b) a processed version of the data; and (c) derivative data generated from the data.

16. The system of claim 1, wherein software workflows determine which of the data to discard, which of the data to process, which of the data to transmit, and which of the data to retain; the data consisting of at least one or more of: the image data, the sensor data, and processed image data or processed sensor data containing either object data or discard data.

17. The system of claim 1, wherein the data is stored on a local storage of the device prior to transmission to the server, and the data is deleted from the local storage once successfully transmitted to the server.

18. The system of claim 17 wherein the device can transmit any, none, some or all of the data to the server.

19. The system of claim 1, wherein an alert is generated by the device in order to alert a user of the device through a client application to potential issues pertaining to the sign identified by said comparing.

20. The system of claim 1, wherein the device makes available the data for neural network training.

* * * * *